(12) United States Patent
Kobayashi

(10) Patent No.: US 10,051,274 B2
(45) Date of Patent: Aug. 14, 2018

(54) IMAGE PROCESSING APPARATUS, METHOD OF CALCULATING INFORMATION ACCORDING TO MOTION OF FRAME, AND STORAGE MEDIUM

(71) Applicant: CANON KABUSHIKI KAISHA, Tokyo (JP)

(72) Inventor: Masaaki Kobayashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 479 days.

(21) Appl. No.: 14/508,096

(22) Filed: Oct. 7, 2014

(65) Prior Publication Data

US 2015/0117539 A1 Apr. 30, 2015

(30) Foreign Application Priority Data

Oct. 25, 2013 (JP) ................................ 2013-222685
Mar. 17, 2014 (JP) ................................ 2014-053987

(51) Int. Cl.
| | | |
|---|---|---|
| *H04N 19/17* | (2014.01) | |
| *H04N 19/52* | (2014.01) | |
| *H04N 19/174* | (2014.01) | |
| *H04N 19/176* | (2014.01) | |
| *H04N 19/513* | (2014.01) | |

(52) U.S. Cl.
CPC ......... *H04N 19/174* (2014.11); *H04N 19/176* (2014.11); *H04N 19/521* (2014.11)

(58) Field of Classification Search
None
See application file for complete search history.

(56) References Cited

U.S. PATENT DOCUMENTS

| | | | | |
|---|---|---|---|---|
| 2002/0118761 A1* | 8/2002 | Lee | ..................... | H04N 5/23248 375/240.27 |
| 2009/0066800 A1* | 3/2009 | Wei | ..................... | H04N 5/23248 348/208.99 |
| 2009/0115859 A1* | 5/2009 | Lee | ..................... | H04N 5/23248 348/208.4 |

(Continued)

FOREIGN PATENT DOCUMENTS

| | | |
|---|---|---|
| JP | 2007-334625 A | 12/2007 |
| JP | 2008-072665 A | 3/2008 |
| JP | 2010-118822 A | 5/2010 |

OTHER PUBLICATIONS

Toru Tamaki, "Pose Estimation and Rotation Matrices", IEICE Technical Report SIP2009-48, SIS2009-23(Sep. 2009), pp. 59-64, Hiroshima, Japan.

(Continued)

*Primary Examiner* — William C Vaughn, Jr.
*Assistant Examiner* — Lindsay Uhl
(74) *Attorney, Agent, or Firm* — Fitzpatrick, Cella, Harper & Scinto

(57) ABSTRACT

An image processing apparatus that calculates information according to a motion of a frame of a moving image based on a motion vector detected in the frame decides the representative motion vector of each of a plurality of regions in the frame based on the detected motion vector, and calculates the information according to the motion of the frame based on, out of the motion vectors in each of the plurality of regions, a motion vector whose difference from the representative motion vector of each region is smaller than a predetermined value.

28 Claims, 15 Drawing Sheets

(56) References Cited

U.S. PATENT DOCUMENTS

| | | | | |
|---|---|---|---|---|
| 2009/0231446 A1* | 9/2009 | Lin | .................... | H04N 5/23248 |
| | | | | 348/208.4 |
| 2009/0290029 A1* | 11/2009 | Li | ........................ | G06T 7/2013 |
| | | | | 348/208.4 |
| 2010/0118156 A1* | 5/2010 | Saito | ...................... | H04N 5/144 |
| | | | | 348/208.6 |
| 2012/0162454 A1* | 6/2012 | Park | ...................... | H04N 5/145 |
| | | | | 348/208.6 |
| 2012/0327254 A1* | 12/2012 | Iwahashi | ................. | G06T 7/223 |
| | | | | 348/208.4 |

OTHER PUBLICATIONS

M.A. Fischler and R.C. Bolles, "Random Sample Consensus: A Paradigm for Model Fitting with Applications to Image Analysis and Automated Cartography", Communications of the ACM, vol. 24(6), 1981, pp. 381-395.

Dario A. Bini, et al., "Algorithms for the matrix pth root", Numerical Algorithms, vol. 39, 2005, pp. 349-378.

* cited by examiner

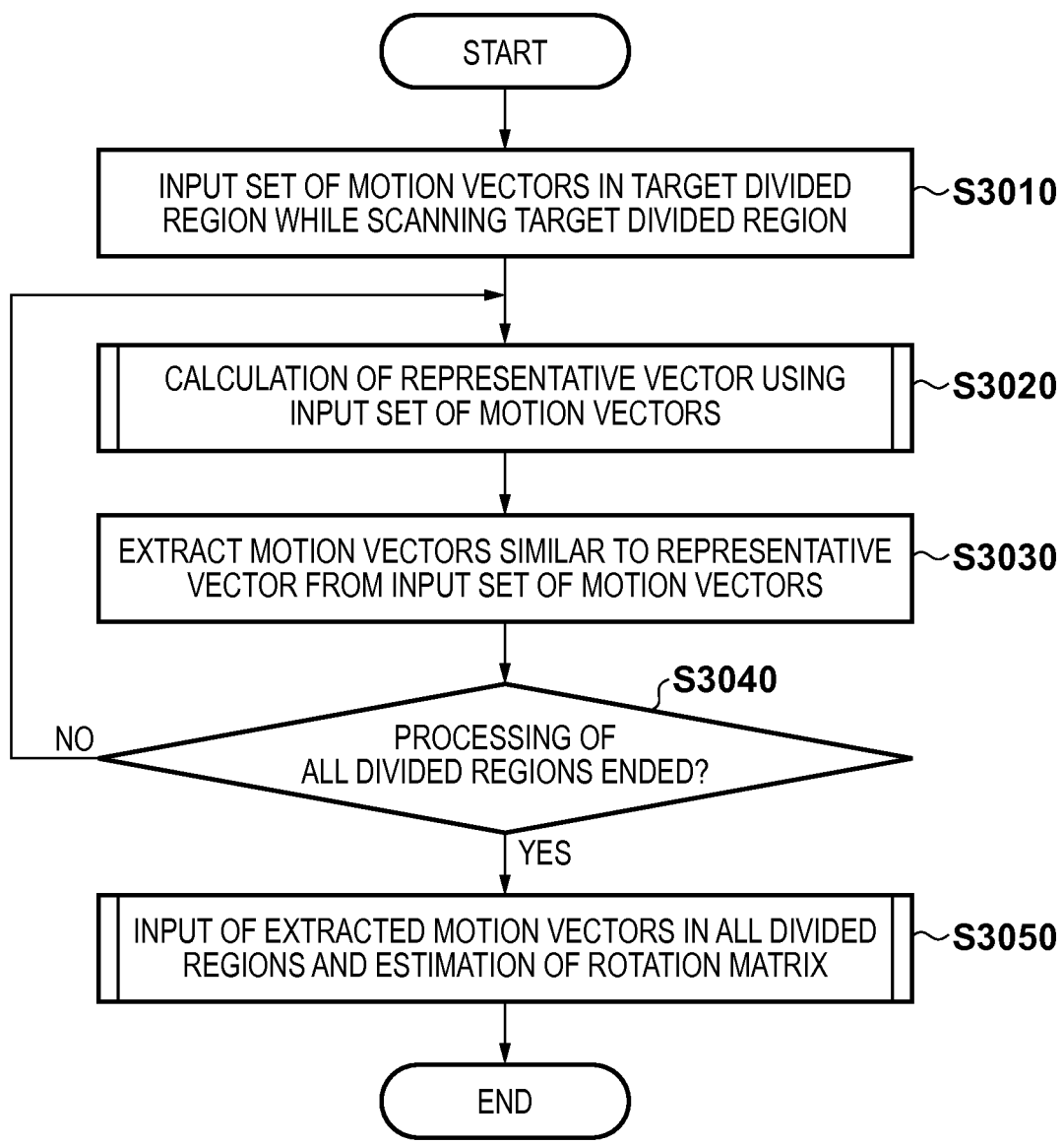

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |

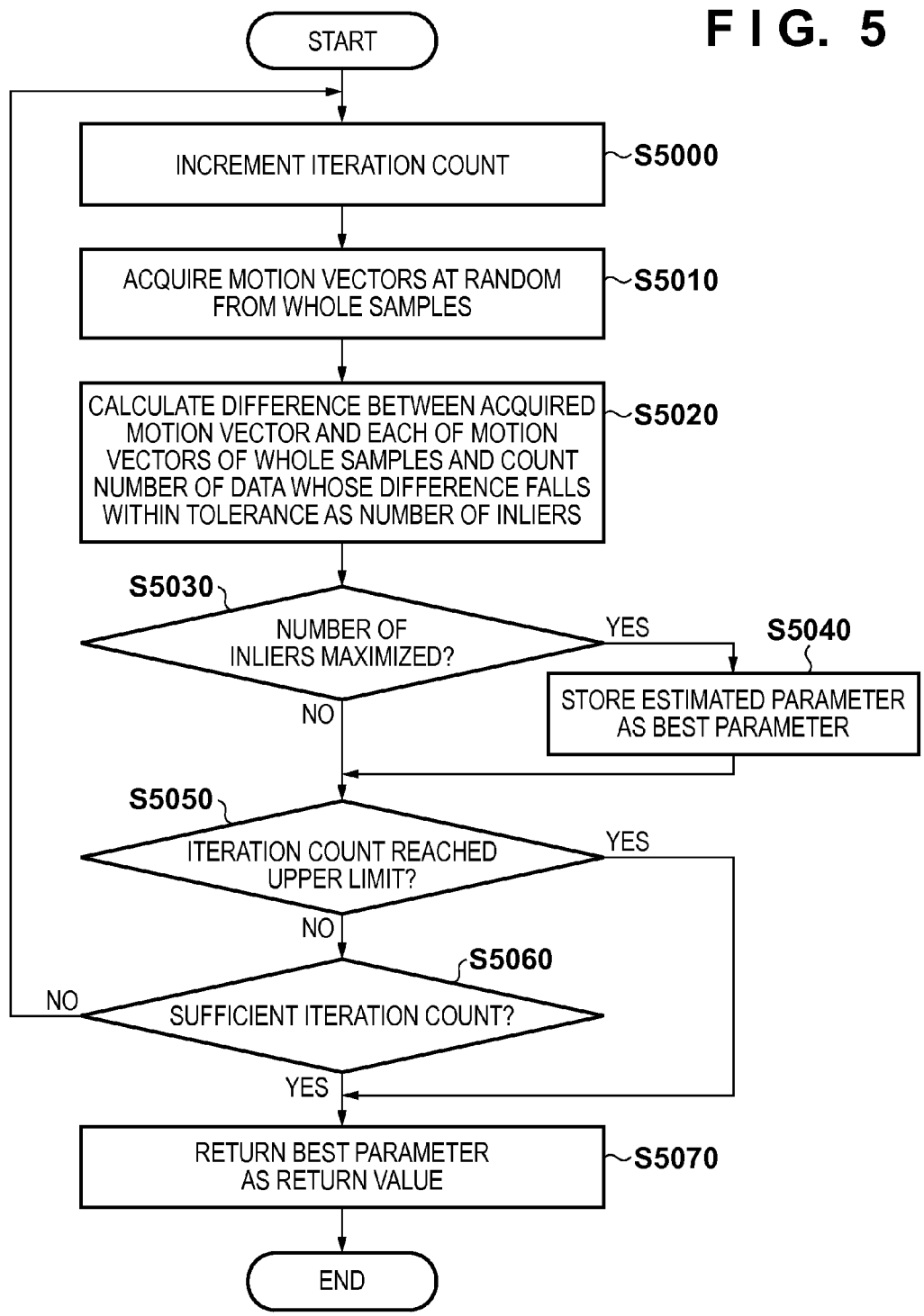

IMAGE PROCESSING APPARATUS, METHOD OF CALCULATING INFORMATION ACCORDING TO MOTION OF FRAME, AND STORAGE MEDIUM

BACKGROUND OF THE INVENTION

Field of the Invention

The present invention relates to an image processing apparatus and a method of calculating information according to the motion of a frame.

Description of the Related Art

Along with improvement of the calculation performance of computers, utility of image processing technologies such as region division and alignment in a field called computer vision is growing.

For image alignment, a plurality of motion vectors are calculated from images that are temporally continuous, and motion parameters that express the position shift (motion of the entire image) of the images are calculated from the motion vectors. As the motion vector calculation method, motion search by block matching, a method of detecting feature points, calculating the correspondence between them, and defining the coordinates of corresponding point pairs as motion vectors, or the like is usable (Japanese Patent Laid-Open No. 2007-334625).

The motion parameters can be expressed using two-dimensional vectors, homography matrices, rotation matrices (see Toru Tamaki, "Pose Estimation and Rotation Matrices", IEICE Technical Report SIP2009-48, SIS2009-23 (2009-09)), or the like. However, not all detected motion vectors are always correct, and wrong motion vectors may be included. For this reason, a robust estimation technique of estimating a model from data including errors is necessary.

A representative robust estimation algorithm is RANSAC (see "Random sample consensus: A paradigm for model fitting with applications to image analysis and automated cartography", M. A. Fischler and R. C. Bolles, Communications of the ACM, 24(6): 381-395, 1981). RANSAC is a technique of estimating an optimum model while repeating calculations. However, the larger the error amount of data is or the larger the number of elements of parameters to be estimated is, the larger the number of repetitions (to be referred to as iterations hereinafter) needed by the RANSAC is. Wrong data will be referred to as "outlier," and correct data as "inlier" hereinafter.

The image alignment techniques are variously applicable to image blur correction (digital image-stabilization), image composition, encoding, free viewpoint generation, and the like. For example, for a plurality of continuous frames, inverse matrices of matrices expressing the motion between the frames are created by the above-described method. The plurality of inverse matrices are smoothed, and the images are geometrically transformed using the smoothed matrices, thereby correcting motion blurs. The matrix smoothing can be calculated using the moving geometric mean of the matrices. The power root of the matrices necessary to calculate the geometric mean can be calculated using a method described in, for example, "Algorithms for the matrix pth root", Dario A. Bini, Nicholas J. Higham, and Beatrice Meini, Numerical Algorithms (2005) 39: 349-378.

When calculating, as motion parameters, matrices that express the motion of an entire image from motion vectors including outliers, robust estimation such as RANSAC is necessary. If the outlier ratio of data is high, the RANSAC needs many iterations and takes a long time to process.

SUMMARY OF THE INVENTION

It is an object of the present invention to improve the processing speed and processing accuracy of image processing.

The present invention provides an image processing apparatus that calculates information according to a motion of a frame of a moving image based on a motion vector detected in the frame, comprising: a decision unit configured to decide a representative motion vector of each of a plurality of regions in the frame based on the detected motion vector; and a calculation unit configured to calculate the information according to the motion of the frame based on, out of the motion vectors in each of the plurality of regions, a motion vector whose difference from the representative motion vector of each region is smaller than a predetermined value.

The present invention also provides an image processing apparatus that calculates information according to a motion of a frame of a moving image based on a motion vector detected in the frame, comprising: a decision unit configured to decide a variation in motion vectors detected in each of a plurality of regions in the frame; and a calculation unit configured to calculate the information according to the motion of the frame based on the variation in the motion vectors detected in each of the plurality of regions in the frame.

Further features of the present invention will become apparent from the following description of exemplary embodiments with reference to the attached drawings.

BRIEF DESCRIPTION OF THE DRAWINGS

FIG. 3 is a flowchart showing details of transformation matrix estimation processing;

FIG. 5 is a flowchart showing details of representative vector calculation processing;

DESCRIPTION OF THE EMBODIMENTS

The embodiments of the present invention will now be described in detail with reference to the accompanying drawings.

The first embodiment will be described first in which a plurality of motion vectors are calculated from images that are temporally continuous, and motion parameters that express the motion of the entire image are calculated from the motion vectors for image alignment. In this embodiment, rotation matrices (see Toru Tamaki, "Pose Estimation and Rotation Matrices", IEICE Technical Report SIP2009-48, SIS2009-23(2009-09)) are calculated as motion parameters that express the motion (for example, position shift) of the entire image. Additionally, in this embodiment, an application example will be explained in which matrices are estimated from continuous images, and digital image-stabilization processing is performed for the image.

Figure 1A:
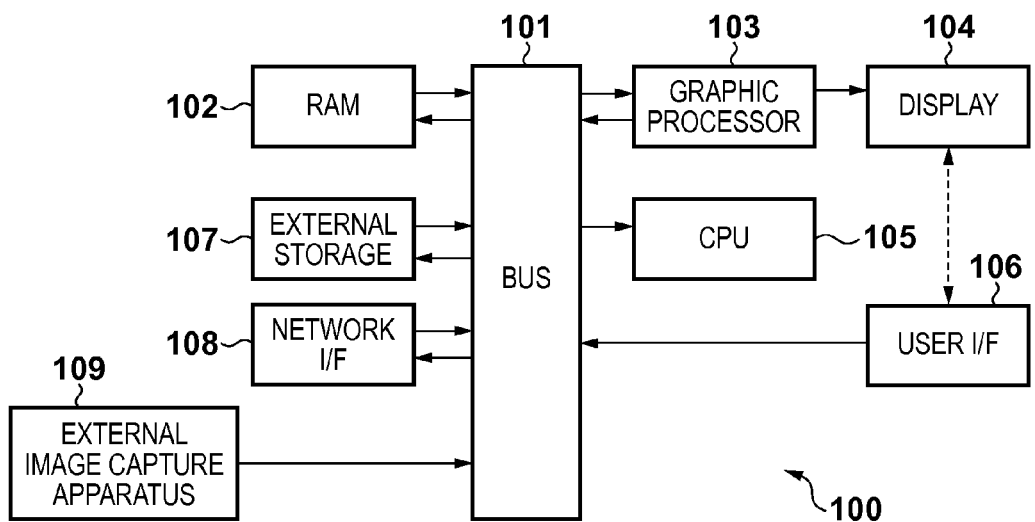
FIG. 1A is a block diagram for explaining an apparatus arrangement.

In this embodiment, a CPU (Central Processing Unit) performs processes of analyzing a captured image and detecting feature points in a PC (Personal Computer) serving as an information processing apparatus with a display connected. The arrangement of the PC and the operation of each module will be described below with reference to FIG. 1A. FIG. 1A is a block diagram for explaining the internal arrangement of the PC.

A bus 101 connects various constituent elements in a PC 100 to each other and serves as a data communication path between the constituent elements. A RAM (writable memory) 102 functions as a storage area such as the work area of a CPU 105. A graphic processor 103 is a processor that performs calculation processing necessary when displaying an image on a display 104. The graphic processor 103 can do a matrix operation and perform geometric transformation such as rotation of an image in accordance with a matrix. The display 104 is a display device that displays information such as a command input from a user I/F 106 and an output of the PC 100 responding to the command.

The CPU 105 controls the operation of the entire PC 100 by cooperating with other constituent elements based on computer programs such as an OS (Operating System) and application programs. Note that in this embodiment, a description will be made assuming that there exists one CPU. However, the present invention is not limited to this, and an arrangement including a plurality of CPUs may be employed. In that case, the processes can be executed by multithread processing in parallel.

The user I/F 106 receives input of an instruction or command from the user to activate a program. The user I/F 106 is a touch panel, a pointing device, a keyboard, or the like but is not limited to specific device. When the user I/F 106 is a touch panel or a pointing device, it can input information representing whether an arbitrary coordinate position on the display 104 is touched.

A nonvolatile external storage 107 functions as a mass memory. In this embodiment, the external storage 107 is implemented by a hard disk drive (to be referred to as an HD hereinafter). However, another storage device such as an SSD (solid state drive using a flash memory) may be used.

A network I/F 108 relays data transmission/reception to/from an external apparatus. An external image capture apparatus 109 is formed from a camera or the like, and can capture an object and acquire a captured image.

In particular, the external image capture apparatus 109 includes, for example, a lens, a sensor, and a lens control unit. The lens control unit controls zooming and focusing of the lens. The sensor receives light input from the lens and converts the light signal into RGB image data. After that, the RGB image data is transferred from the external image capture apparatus 109 via the bus 101 and stored in the RAM 102 or recorded in the external storage 107.

In this embodiment, the programs to be executed and the data are recorded in the external storage 107. They are input to the RAM 102 and executed and processed by the CPU 105. The programs and data are input/output via the bus 101. Image data is input from the external storage 107 and, at the time of input, converted into an internal image format to be processed in the PC 100, unless otherwise specified. The image data can also be input from the external image capture apparatus 109 or the network I/F 108.

In this embodiment, the internal image format is an RGB image. However, the present invention is not limited to this, and a YUV image or a monochrome luminance image is also usable. A description will be made assuming that motion detection (to be described later) is performed using a luminance image, and if the internal image format is an RGB image or YUV image, motion detection is performed after conversion. In the first embodiment, a description will be made assuming that image data having, for example, a size of 1920×1088 pixels and a frame rate of 30 fps is handled. However, the image size and the frame rate are not limited to these.

A UI (User Interface) screen or a processed image result can be displayed on the display 104 via the graphic processor 103. The graphic processor 103 can geometrically transform input image data, and can store the transformed image data in the RAM 102 or directly output it to the display 104. When recorded in the external storage 107 or stored in the RAM 102, the processed data can be shared by other programs.

Note that in this embodiment, an example in which an information processing apparatus for performing digital image-stabilization processing is implemented by the PC will be described. However, the present invention is not limited to this. The digital image-stabilization processing according to this embodiment can be executed using an information appliance such as an image capture apparatus, an embedded system, a tablet terminal, or a smartphone. An arrangement that causes hardware to wholly or partially execute the processing may be employed.

Figure 1B:
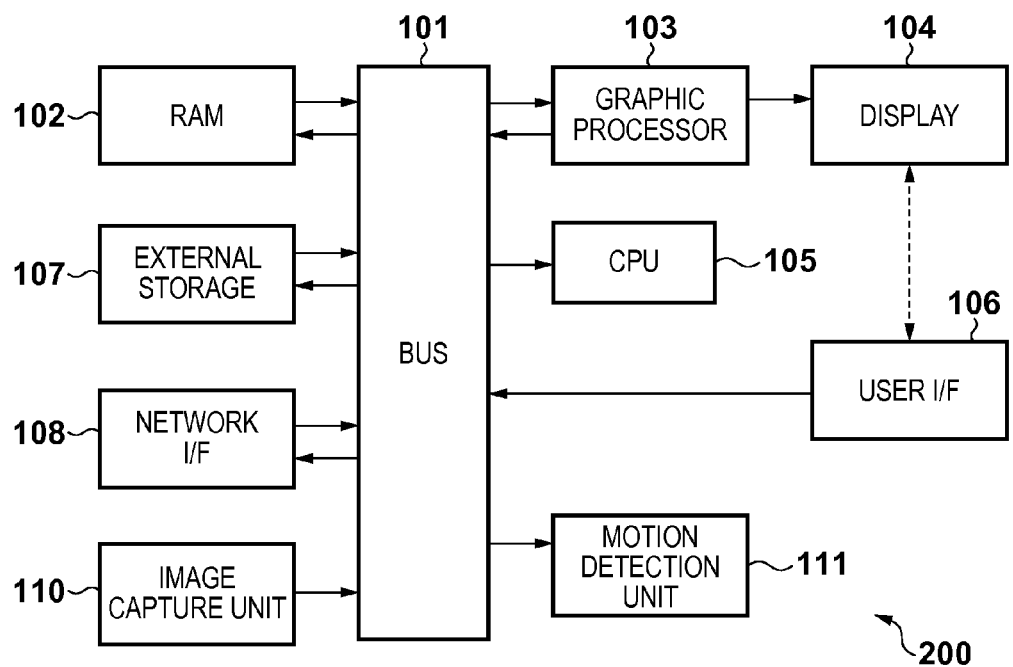
FIG. 1B is a block diagram for explaining an apparatus arrangement.

For example, FIG. 1B shows the arrangement of an image capture apparatus 200. Reference numeral 110 denotes an image capture unit; and 111, a motion detection unit. Note that the same reference numerals as in FIG. 1A denote the same constituent elements in FIG. 1B, and a description thereof will be omitted. Referring to FIG. 1B, an image is input from the image capture unit 110, and the motion detection unit 111 detects motion vectors. Processing to be explained in this embodiment can thus be executed by the image capture apparatus as well. A description will be made assuming that if no dedicated circuits exist, the CPU 105 performs operations, and if dedicated circuits exist, the respective circuits perform the operations.

Figure 2:
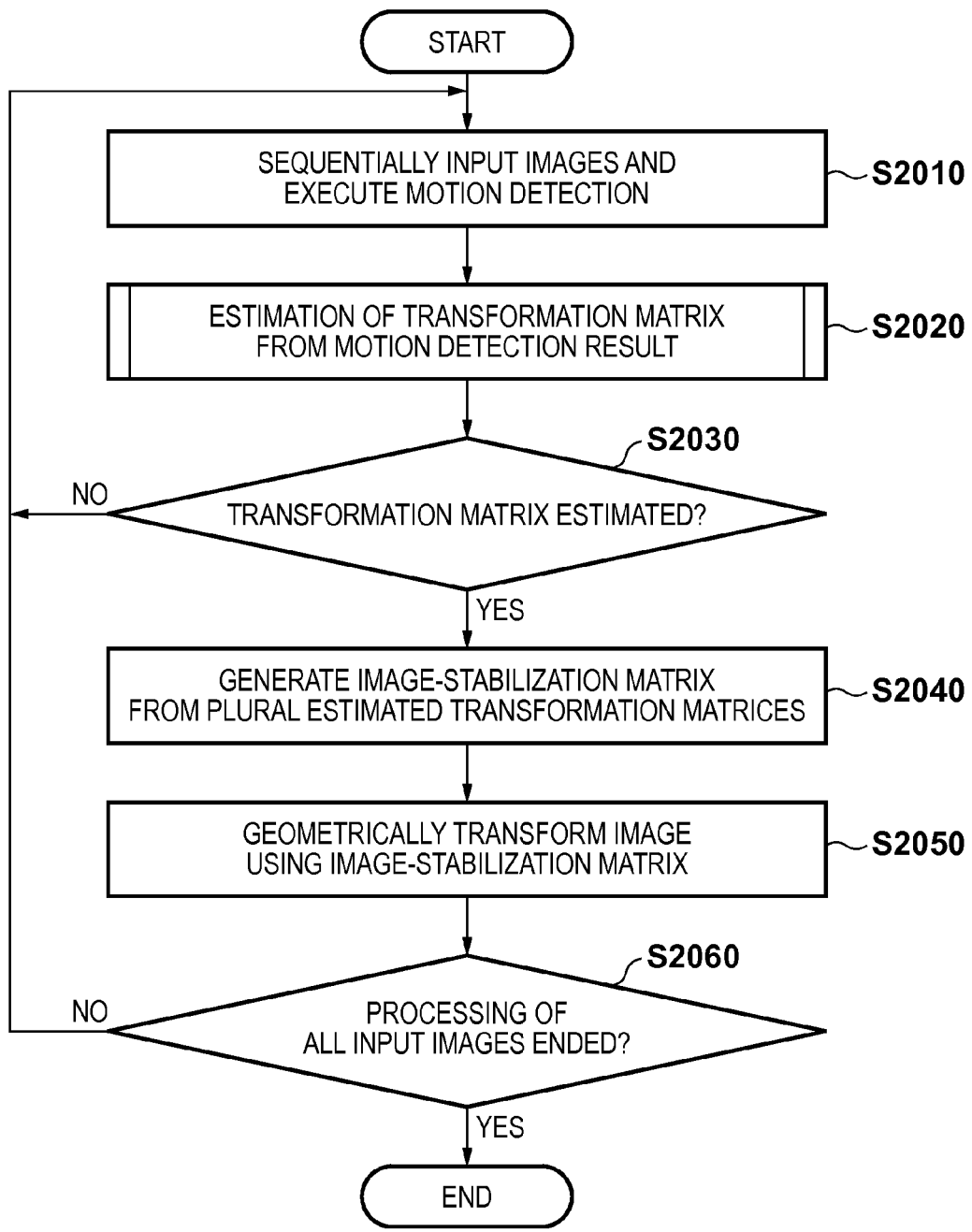
FIG. 2 is a flowchart showing digital image-stabilization processing.

A method of estimating matrices expressing the motion of an entire image from continuous images and executing digital image-stabilization processing will be described in detail with reference to FIG. 2. FIG. 2 is a flowchart showing digital image-stabilization processing. Note that the flowchart of FIG. 2 is implemented by causing the CPU 105 to read out and execute a program recorded in the external storage 107. The CPU 105 executes the processing by cooperating with various constituent elements shown in FIG. 1A or 1B in accordance with the processing contents.

The flowchart will be explained below assuming that the steps are executed in the order of step numbers unless otherwise specified. Independent processes that have no interdependence need not be executed in the illustrated order of steps, and can be executed in a changed order. If there exist a plurality of CPUs, the processes can be executed in parallel. Similarly, the positions of subroutines where steps exist are not particularly limited. The configuration of subroutines is not particularly limited, and an arrangement that executes processes in different subroutines may be employed as long as the same processing result can be obtained.

In step S2010, the CPU 105 or the motion detection unit 111 sequentially inputs images and executes motion detection. In this embodiment, a description will be made assuming that the luminance images of the (c−1)th and cth frames are input, and motion vectors expressing transformation (motion) of the cth frame (processing target image) are detected from the (c−1)th frame (reference image). The frame number of the input image starts from 0, and that of the processing target starts from 1. A description will be made assuming that the value c is incremented every time this step is executed.

The motion detection is done by detecting feature points, matching the feature amounts of feature points between the images, and defining the corresponding position relationship as motion vectors. The feature point detection method is FAST, and the feature amount calculation method is BRIEF. However, the method is not limited to this, and SIFT may be used. Parameters of feature point detection are set such that about 2,000 motion vectors are detected per screen.

However, the motion detection algorithm is not limited to this. For example, an arrangement that divides a luminance image into blocks (divided regions) each having 32 vertical pixels×32 horizontal pixels and performs motion search by block matching on a block basis (divided region basis) may be employed.

In this embodiment, one motion vector is a directed line segment formed from the coordinates of starting and end points. One motion vector is expressed as $$v=\{A,B\}=\{(x',y'),(x,y)\}$$

where A and B are the starting and end points of the motion vector. The pure vector component of the motion vector is expressed as $$\vec{v}=\vec{AB}=(x-x',y-y')$$

Let X be a set of a plurality of motion vectors, and i be an index number that identifies an individual motion vector of X. Each motion vector is expressed as $$v_i=\{A_i,B_i\}=\{(x_i',y_i'),(x_i,y_i)\}$$

At this time, X is expressed as $$X=\{v_1,v_2,v_3,\ldots\}$$

A description will be made below assuming that $$v,A,B,x',y',x,y,\vec{v},\vec{AB}$$

having a common subscript express the same vectors and the elements thereof, unless otherwise specified.

In this embodiment, a description will be made assuming that each numerical value handles a floating point. However, a calculation method using a fixed point may be employed. When referring to a pixel of an image, the pixel is referred using, as a coordinate value, a numerical value with its fractional portion dropped, unless otherwise specified.

In this embodiment, a set is implemented as a sequence. Each element of a set is expressed as $$v_i=X[i]$$

or $$\vec{v_i}=\vec{X[i]}$$

A description will be made assuming that the element can be referred as a motion vector that is an element of the set or a vector component thereof.

The number of elements of a set is expressed by sandwiching the set by | |. For example, the number of elements of a set X is expressed as |X|. Note that the set need not always be implemented as a sequence. For example, it may be implemented as a list, and the data structure that handles a data set is not particular limited.

In step S2020, the CPU 105 estimates a transformation matrix from the motion detection result. Details of the transformation matrix estimation method will be described later with reference to FIG. 3. In this embodiment, let $H_c$ be a transformation matrix representing the change from the (c−1)th frame to the cth frame. In this embodiment, a description will be made assuming that $H_c$ is a rotation matrix that is a 3×3 matrix (see Toru Tamaki, "Pose Estimation and Rotation Matrices", IEICE Technical Report SIP2009-48, SIS2009-23(2009-09)). However, the format of the matrix is not particularly limited, and any other matrix such as an affine transformation matrix or a homography matrix may be used.

In step S2030, the CPU 105 determines whether transformation matrices as many as or more than the number of an image-stabilization frame period necessary to generate an image-stabilization matrix could be estimated. Let p be the image-stabilization frame period. If c≥p is true (YES in step S2030), the process advances to step S2040. If false (NO in step S2030), the process advances to step S2010. The value p is assumed to be, for example, 16. To suppress long-period blurs, p is set large. To suppress only short-period blurs, p is set small.

In step S2040, the CPU 105 generates an image-stabilization matrix from the plurality of estimated transformation matrices. The image-stabilization aims at suppressing high-frequency blurs. The image-stabilization matrix is obtained by smoothing the transformation matrices over a plurality of frames. In this embodiment, the image-stabilization matrix is calculated from the transformation matrices of past frames and the immediately preceding image-stabilization matrix. For example, let $S_c$ be the image-stabilization matrix of the cth frame. $S_c$ is calculated by $$S_c = \sqrt[p']{\prod_{i=c-p'+1}^{c} H_i \times S_{c-1}^{-1}} \times S_{c-1} \times H_{c-p'+1}^{-1} \quad (1)$$

for $p' = \min(c, p)$

Note that the power root of the matrix can be calculated by approximate calculation, and can be calculated by a method described in "Algorithms for the matrix pth root", Dario A. Binia, Nicholas J. Highamb, and Beatrice Meinia, Numerical Algorithms (2005) 39: 349-378. Since there may exist a plurality of power roots of the matrix, a restriction is provided to uniquely decide the matrix. In this embodiment, since the matrix is a rotation matrix, a matrix having the smallest rotation amount is selected. If the power root of the matrix cannot be calculated, the processing is progressed assuming that the image-stabilization matrix $S_c$ is a unit matrix. Note that the method of smoothing the matrix is not limited to this.

In step S2050, the CPU 105 geometrically transforms the image using the image-stabilization matrices. In this embodiment, the RGB image of the (c−p+1)th frame is input, and processing is performed for each of the R, G, and B channels. A description will be made below assuming that the input image and the output image are channel images.

At this time, let $(x_{out}, y_{out})$ be a pixel position of the output image that is the image after geometric transformation, $(x_{in}, y_{in})$ be a pixel position of the input image, and $$M = \begin{pmatrix} m_{11} & m_{12} & m_{13} \\ m_{21} & m_{22} & m_{23} \\ m_{31} & m_{32} & m_{33} \end{pmatrix}$$

be the transformation matrix from the output image to the input image. A proj function that calculates $(x_{in}, y_{in})$ from $(x_{out}, y_{out})$ can be expressed as $$(x_{out}, y_{out}) = proj(M, (x_{in}, y_{in})) \qquad (2)$$
$$= \left( \frac{m_{11}x_{in} + m_{12}y_{in} + m_{13}}{m_{31}x_{in} + m_{32}y_{in} + m_{33}}, \frac{m_{21}x_{in} + m_{22}y_{in} + m_{23}}{m_{31}x_{in} + m_{32}y_{in} + m_{33}} \right)$$

In this step, the position of the corresponding pixel of the input image corresponding to the scanning target pixel of the output image is calculated using a proj function with $M=S^{-1}$ while scanning the pixels of the output image one by one. All pixel values of the output image are decided using the pixel value of the corresponding pixel as the pixel value of the scanning target pixel.

Note that when the pixel position $(x_{out}, y_{out})$ of the output image is calculated as a lattice point, the pixel position $(x_{in}, y_{in})$ of the input image has a fractional value. Hence, a method of performing interpolation using a method such as bilinear or bicubic interpolation and calculating more accurate pixel values may be employed. The CPU 105 displays the transformed image on the display 104 or records it in the external storage 107.

In step S2060, the CPU 105 determines whether the processing of all input images has ended. If the processing of the input images has ended (YES in step S2060), the processing ends. If the processing of the input images has not ended (NO in step S2060), the process returns to step S2010, and the processes of steps S2010 to S2060 are repeated. In this embodiment, as the processing end condition, whether the processing of all input images has ended is determined. However, the present invention is not limited to this. For example, the processing may be ended by determining whether a UI operation with which the user instructs to end the processing is performed.

Details of the transformation matrix estimation processing of step S2020 will be described next with reference to FIG. 3.

FIG. 3 is a flowchart showing details of transformation matrix estimation processing.

In step S3010, the CPU 105 scans a target divided region and inputs a set of motion vectors in the divided region for each divided region.

Figures 4A, 4B:
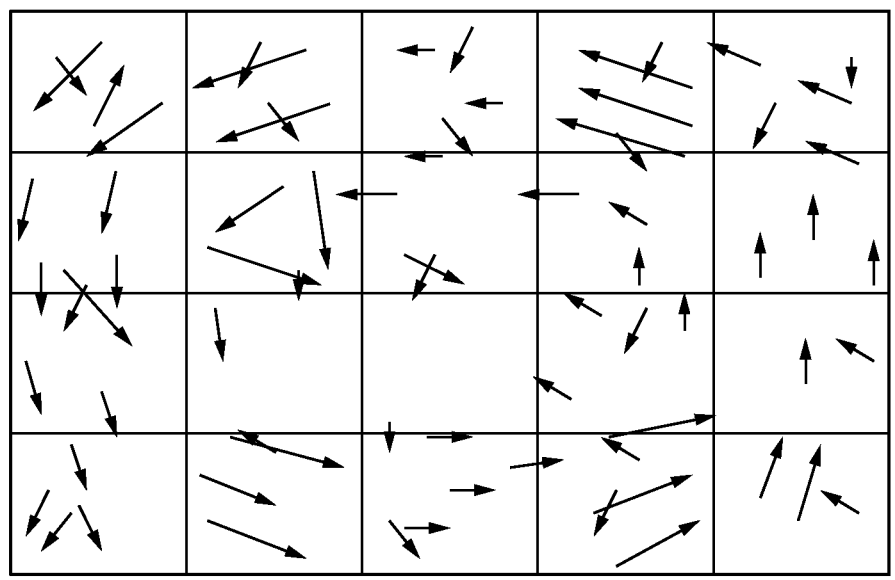
FIG. 4A is a view for explaining an example of image division.
FIG. 4B is a view for explaining an example of image division.

The divided region scanning method will be described below in detail with reference to FIGS. 4A and 4B. FIGS. 4A and 4B are views for explaining an example of image division. FIG. 4A is a view illustrating an image division method and divided region numbers. In this embodiment, the divided regions are scanned in accordance with the raster order, as indicated by the numerical values shown in FIG. 4A. That is, when executing step S3010 for the first time, the divided region of number 1 is set as the processing target. When executing the step for the second time, third time, . . . , the divided regions of divided region numbers 2, 3, . . . , are set as the processing target.

In step S3010, motion vectors each having the end point (point with an arrowhead) in the target divided region are input. In this embodiment, let d be the number of the divided region, and the divided region will be expressed as a divided region d hereinafter. The maximum number of divisions will be expressed as $d_{max}$. In this embodiment, $d_{max}=20$. The number d starts from 1 and is incremented every time step S3010 is executed.

FIG. 4B is a view illustrating the state of motion vectors. As shown in FIG. 4B, the motion vectors may extend across the divided regions. In this embodiment, a motion vector v with its end point included in a divided region is handled as a motion vector of the divided region. Let in (d, B) be a function that determines whether an end point B of the motion vector v is included in the divided region d. A set $Y_d$ of vectors included in the divided region d is expressed as $$Y_d = \{v \in X | in(d,B) = true\} \text{ for } v = \{A,B\} \qquad (3)$$

This notation indicates scanning the elements of the set X, extracting the elements that meet the condition expressed from "|", and generating $Y_d$ that is the subset of the extracted elements. Subset generation will be explained hereinafter using the same notation. Note that instead of generating a new sequence or list as a subset, an arrangement that provides each element with a flag representing whether it is a subset, and sets the flag at the time of extraction of the elements may be employed. This arrangement can acquire only elements as a subset by scanning the elements of the superset and referring to the flag of each scanning target element.

Note that an arrangement that creates the set $Y_d$ of vectors included in the divided region d in advance and only inputs it in this step may be employed. In this embodiment, the image is divided into 20 regions as shown in FIGS. 4A and 4B, as described above. However, the division method is not limited to this. In this embodiment, motion vectors each having the end point in the divided region are input, as described above. However, an arrangement that inputs motion vectors each having the starting point in the divided region may be employed. The divided region scanning order is not limited to the raster order.

Let neighbour(d, B) be a function that determines whether the end point B of the motion vector v is included in any one of the eight neighboring divided regions of the divided region and the local region. The set $Y_d$ of vectors may be created using $$Y_d = \{v \in X | neighbour(d,B) = true\} \text{ for } v = \{A,B\} \qquad (4)$$

For example, when the divided region number is 9, the eight neighboring divided regions of the divided region and the local region are nine divided regions surrounded by the thick lines in FIG. 4A. However, if the neighboring regions exist outside the screen, the set $Y_d$ of vectors is created from the regions within the screen.

In step S3020, the CPU 105 calculates a representative vector (first motion parameter) using the input motion vectors. In this embodiment, a subroutine of calculating a representative vector is executed. The operation of the subroutine will be described later with reference to FIG. 5. Note that in this embodiment, the subroutine will be described with reference to the flowchart of FIG. 5 using robust estimation. However, another estimation method such as M estimation or least median square may be used. The representative vector will be expressed as $$\vec{v}_d$$

hereinafter.

In step S3030, the CPU 105 extracts a motion vector (similar motion vector) corresponding to the representative vector from the set of input motion vectors. In this embodiment, a tolerance in robust estimation is set, and an input motion vector whose vector component difference from the representative vector has an absolute value within the tolerance is extracted as a similar motion vector corresponding to the representative vector. A tolerance value $e_2$ is assumed to be calculated, for a tolerance $e_h$ (3 is set in this embodiment) of RANSAC processing used in step S3050 (to be described later), by $$e_2 = k e_h \text{ for } k \geq 1 \quad (5)$$

Note that in this embodiment, k=5. However, the value is not limited to this. As described above, the tolerance value $e_2$ in step S3020 is set to be larger than the tolerance $e_h$ in step S3050.

Let image_height be the height of the image, and div be the divisor. The tolerance $e_h$ may be calculated using $$e_2 = k \times \text{image\_height} / \text{div} \quad (6)$$

Note that in this embodiment, the calculation is done by setting k=5 and div=360. However, the values are not limited to those.

At this time, a set $V_d$ of extracted motion vectors in the divided region d of the cth frame can be extracted by $$V_d = \{v \in Y_d | \text{dist}(\vec{v}_d, \vec{v}) \leq e_2\} \quad (7)$$

$$\text{dist}(\vec{v'}, \vec{v}) = |\vec{v'} - \vec{v}| \quad (8)$$

Here, the results of sandwiching a vector and a pair of variables having a coordinate form by | | are defined as the L2 norm of the vector and the distance from the origin, respectively.

Note that in this embodiment, the vectors are extracted by determining the tolerance for the absolute value of the difference of the vectors. However, the extraction can be done by any other method. For example, tolerance determination may individually be performed for each component of the difference of a vector. More specifically, a motion vector can be extracted by $$v_d = \{v \in Y_d | x_{\text{diff}} \leq e_{2x} \text{ and } y_{\text{diff}} \leq e_{2y}\} \text{ for} (x_{\text{diff}}, y_{\text{diff}}) = |\vec{v}_d - \vec{v}| \quad (9)$$

The tolerances take values of, for example, $e_{2x}=5e_h$ and $e_{2y}=3e$.

In step S3040, the CPU 105 determines whether the processing of all divided regions has ended. If the processing has ended (YES in step S3040), the process advances to step S3050. If the processing has not ended (NO in step S3040), the process returns to step S3010, and steps S3010 to S3040 are repeated.

In step S3050, the CPU 105 inputs the motion vectors extracted from all divided regions and estimates the rotation matrix (second motion parameter). In this embodiment, a subroutine that executes RANSAC by setting the tolerance $e_h$ to 3 is called. The operation of the subroutine will be described later with reference to FIG. 6.

The operation of the subroutine of calculating the representative vector for each divided region in step S3020 of FIG. 3 will be described below with reference to FIG. 5. FIG. 5 is a flowchart showing details of representative vector calculation processing according of the first embodiment.

In step S5000, the CPU 105 increments the iteration count. Note that the iteration count is initialized to 0 in advance.

In step S5010, the CPU 105 acquires a motion vector at random from whole samples serving as comparison targets. The whole samples in the operation of this subroutine are all motion vectors included in at least one divided region. In this embodiment, one motion vector $v_r$ is acquired.

In step S5020, the CPU 105 calculates the differences between the acquired motion vector and the whole samples, and counts the number of data whose differences fall within the tolerance as the number of inliers. The number of inliers will be referred to as $c_{inlier}$ hereinafter. $c_{inlier}$ can be calculated by $$c_{inlier} = |\{v \in V_d | \text{dist}(\vec{v}_r, \vec{v}) \leq e_h\}| \quad (10)$$

In step S5030, the CPU 105 determines whether the number of inliers is maximized by iterations up to this point. If true (YES in step S5030), the process advances to step S5040. If false (NO in step S5030), the process advances to step S5050. Note that as an exception, when step S5030 is executed for the first time, the process always advances to step S5040.

In step S5040, the CPU 105 stores the acquired motion vector as a best parameter. In this embodiment, the best parameter is $$\vec{v}_d$$

By setting $$\vec{v}_d = \vec{v}_r$$

$$\vec{v}_d$$

is updated.

In step S5050, the CPU 105 determines whether the iteration count has reached the upper limit. If the iteration count has reached the upper limit (YES in step S5050), the process advances to step S5070. If the iteration count has not reached the upper limit (NO in step S5050), the process advances to step S5060.

Note that in this embodiment, the upper limit is 50. However, the count is not limited to this. For example, when the frame rate of the input image is 30 fps, the flowchart of FIG. 2 needs to be completed within 33 ms (millisecond). For this reason, an optimum value is decided in accordance with the specifications and number of CPUs 105.

In step S5060, the CPU 105 determines whether the iteration count is sufficient. If the iteration count is sufficient (YES in step S5060), the process advances to step S5070. If the iteration count is insufficient (NO in step S5060), the process returns to step S5000. The iteration count is determined to be sufficient when it exceeds a value N calculated by $$N = \frac{\log(1 - p_{sample})}{\log(1 - (r_{inlier})^m)} \tag{11}$$

where $p_{sample}$ is the probability that at least one correct sample (motion vector) exists. In this embodiment, the sample is assumed to exist at a probability of 99%, and $p_{sample}=0.99$ is set. m is the number of motion vectors necessary to calculate a parameter. When calculating a two-dimensional vector, m=1. For a homography matrix or rotation matrix, m=4. If $r_{inlier}$ remains the same, the smaller m is, the smaller the value N derived by equation (11) is. That is, in the flowchart of FIG. 5, the smaller m is, the smaller the iteration count is. $r_{inlier}$ in equation (11) is calculated by $$r_{inlier} = \frac{c_{inlier}}{|V_d|} \tag{12}$$

where $c_{inlier}$ is the number of inliers calculated in step S5020, and |V| is the number of elements of the motion vectors extracted in step S3030.

In step S5070, the CPU 105 returns the best parameter as the return value. In this embodiment, $$\vec{v}_d$$

when step S5070 is executed is returned, which corresponds to the representative vector of the divided region.

The operation of the subroutine of estimating the rotation matrix in step S3050 of FIG. 3 will be described below with reference to FIG. 6.

Figure 6:
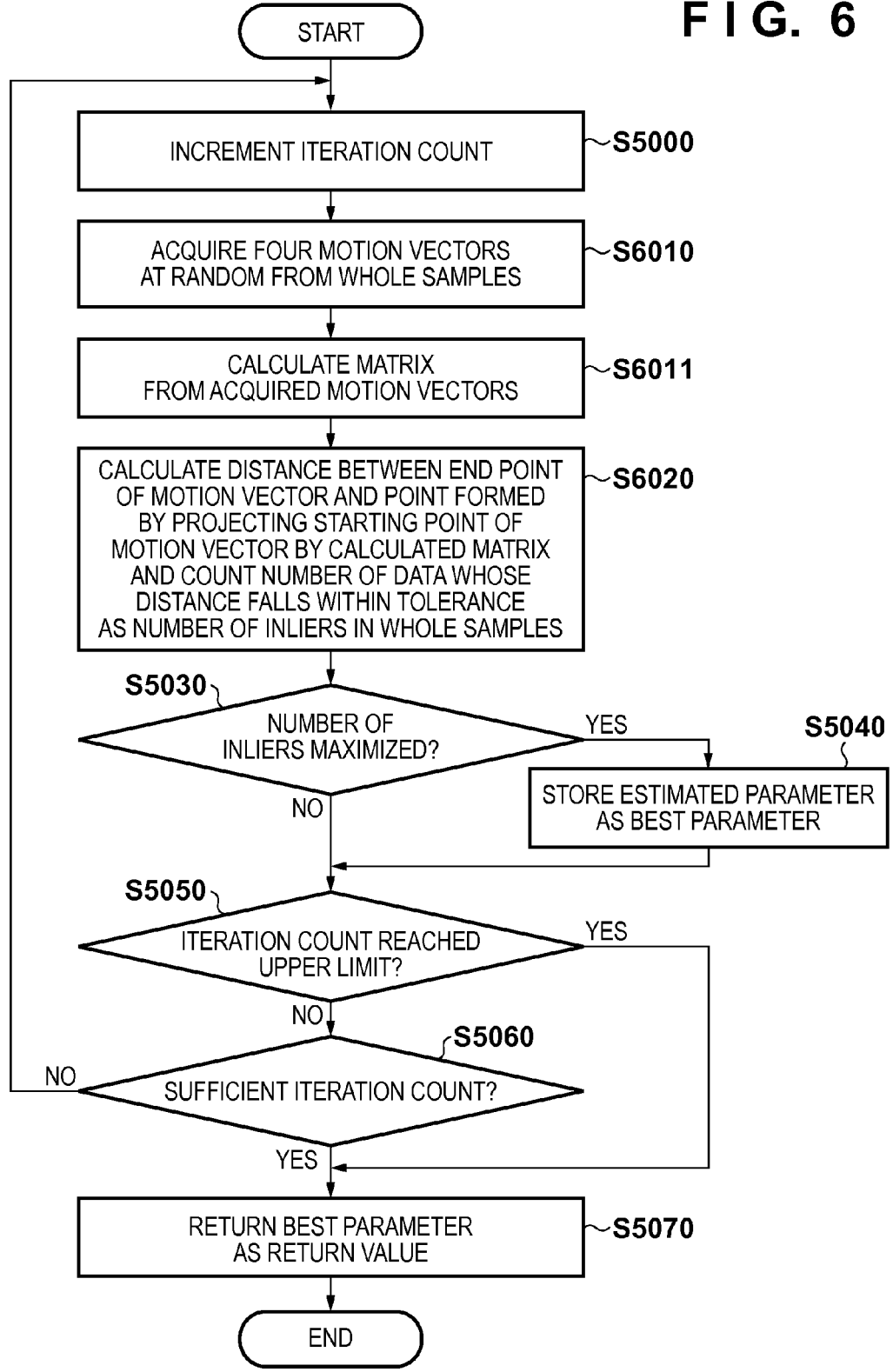
FIG. 6 is a flowchart showing details of rotation matrix estimation processing.

FIG. 6 is a flowchart showing details of rotation matrix estimation processing using RANSAC. The basic operation procedure is the same as the processing of FIG. 5. In FIG. 6, however, step S6011 is added, and steps S6010 and S6020 replace steps S5010 and S5020.

In step S5000, the CPU 105 increments the iteration count.

In step S6010, the CPU 105 acquires four motion vectors from a whole input sample. In this embodiment, the whole input sample is the set of motion vectors extracted in the flowchart of FIG. 3 with respect to all divided regions. That is, a whole input sample Z is expressed as $$Z=\{v \in V_d | 1 \le d \le d_{max}\} \tag{13}$$

In step S6011, the CPU 105 calculates a matrix from the four motion vectors. At this time, the acquired motion vectors are expressed as $v_j$ (j is 1 to 4). The calculated matrix is $$H_c = \begin{pmatrix} h_{11} & h_{12} & h_{13} \\ h_{21} & h_{22} & h_{23} \\ h_{31} & h_{32} & h_{33} \end{pmatrix}$$

in step S2020. In this step, equations are solved, thereby calculating the elements of the rotation matrix, which meet $$(x'_j, y'_j) = proj(H_c, (x_j, y_j)) \tag{14}$$

$$= \left( \frac{h_{11}x_{in} + h_{12}y_{in} + h_{13}}{h_{31}x_{in} + h_{32}y_{in} + h_{33}}, \frac{h_{21}x_{in} + h_{22}y_{in} + h_{23}}{h_{31}x_{in} + h_{32}y_{in} + h_{33}} \right)$$

Note that the rotation matrix can be calculated by various methods. For example, a method described in Toru Tamaki, "Pose Estimation and Rotation Matrices", IEICE Technical Report SIP2009-48, SIS2009-23(2009-09) is usable, and a detailed description thereof will be omitted here. Some rotation matrix calculation methods may be unable to calculate the matrix depending on how to select the sample. It is determined whether matrix calculation has failed. Upon determining that the calculation has failed, the process returns to step S5000 to perform the processing again.

In step S6020, the CPU 105 calculates, in the whole sample, the distance between the end point of a motion vector and a point formed by projecting the starting point of the motion vector by the calculated matrix, and counts the number of data whose distance falls within the tolerance as the number of inliers. The tolerance is $e_h$ described above. The number $c_{Hinlier}$ of inliers in the rotation matrix estimation can be calculated by $$c_{Hinlier} = |\{v \in Z | dist((proj(H_C,(x',y')'))^t-(x,y)) \le e_h\}|$$
$$\text{for } v=\{(x',y'),(x,y)\} \tag{15}$$

From then on, the iteration is repeated, as in FIG. 5, thereby estimating the rotation matrix.

In general, when motion vectors of a high ratio of outliers (to be referred to as an outlier ratio hereinafter) are input, and the rotation matrix is estimated using RANSAC, the iteration count becomes large. In addition, M estimation that is one of robust estimation technologies, in which the processing is relatively light, and the processing time is short, cannot exhibit sufficient estimation performance when the outlier ratio is high.

In this embodiment, the representative vector is calculated for each divided region before matrix estimation, and the similar motion vectors corresponding to the representative vector are extracted. This can remove the outliers of motion vectors to be input to estimate the rotation matrix expressing the motion of the entire image and decrease the iteration count of RANSAC or improve the estimation performance of M estimation.

The processing of calculating the representative vector has a very small processing amount because no complex matrix operation exists. For this reason, when it is applied to RANSAC, the total processing time can largely be shortened even considering the overhead of processing of extracting the similar motion vectors as preprocessing.

For example, in an image having a frame rate of 30 fps, processing of one frame needs to be completed within 33 ms. For this reason, the iteration count needs to have an upper limit. In this case as well, when this embodiment is used, the iteration count hardly reaches the upper limit, and the matrix can stably be estimated. Hence, when applying image-stabilization to an image using a matrix, the probability of matrix estimation failure lowers, and more stable and natural image-stabilization can be performed.

Note that in this embodiment, the method of executing representative vector decision and similar motion vector extraction processing and then calculating the matrix expressing the motion of the entire image has been described using image-stabilization as an example. However, the application that uses the calculated motion information of the entire image is not limited to this. The embodiment is also applicable to image composition, encoding, free viewpoint composition, and the like.

In this embodiment, an arrangement that calculates a two-dimensional representative vector and then calculates a rotation matrix has been described. However, the embodiment is also applicable to an arrangement that calculates a two-dimensional vector representing a region and then calculates an affine transformation matrix expressing the entire plane (processing target image) or calculates an affine transformation matrix representing a region and then calculates a rotation matrix expressing the motion of the entire image. An affine transformation matrix T is expressed as $$T = \begin{pmatrix} t_{11} & t_{12} & t_{13} \\ t_{21} & t_{22} & t_{23} \\ 0 & 0 & 1 \end{pmatrix}$$

Even the affine transformation matrix can be calculated by the same method as the method of calculating a rotation matrix from a plurality of motion vectors. However, since the number of elements is small as compared to the rotation matrix (degree of freedom of parameters is low), the operation amount of the matrix operation is small, and the iteration count necessary for RANSAC can also be small. Hence, the affine transformation matrix can sufficiently be used to estimate motion information representing a region.

In this embodiment, RANSAC is used in the processing of calculating the representative vector. However, the method is not limited to this, and M estimation, least median square, least square method, averaging, or full search robust estimation may be used.

The full search is the same as the flowchart of normal RANSAC except that the step of selecting samples at random changes to a step of sequentially acquiring samples in each iteration, and the iteration is executed as many times as the number of samples at maximum. Even in the full search, since no complex matrix operation exists, the processing load of the processing of calculating the representative vector is not large as compared to a case where a 3×3 matrix is calculated by robust estimation. When processing of aborting the processing based on the ratio of inliers within the tolerance is provided, the iteration need not be performed as many times as the number of samples except the worst case.

Even such a full searching method can have robustness that enables estimation of a parameter from input data including outliers.

As described above, according to the first embodiment, when calculating the motion parameters of the entire image by robust estimation, inliers are extracted in advance, thereby lowering the outlier ratio and shortening the processing time. When the upper limit of the iteration count is set to complete the processing within a predetermined time of moving image processing or the like, the ratio that the iteration count reaches the upper limit can be lowered, and the estimation performance can be stabilized.

Figure 7:
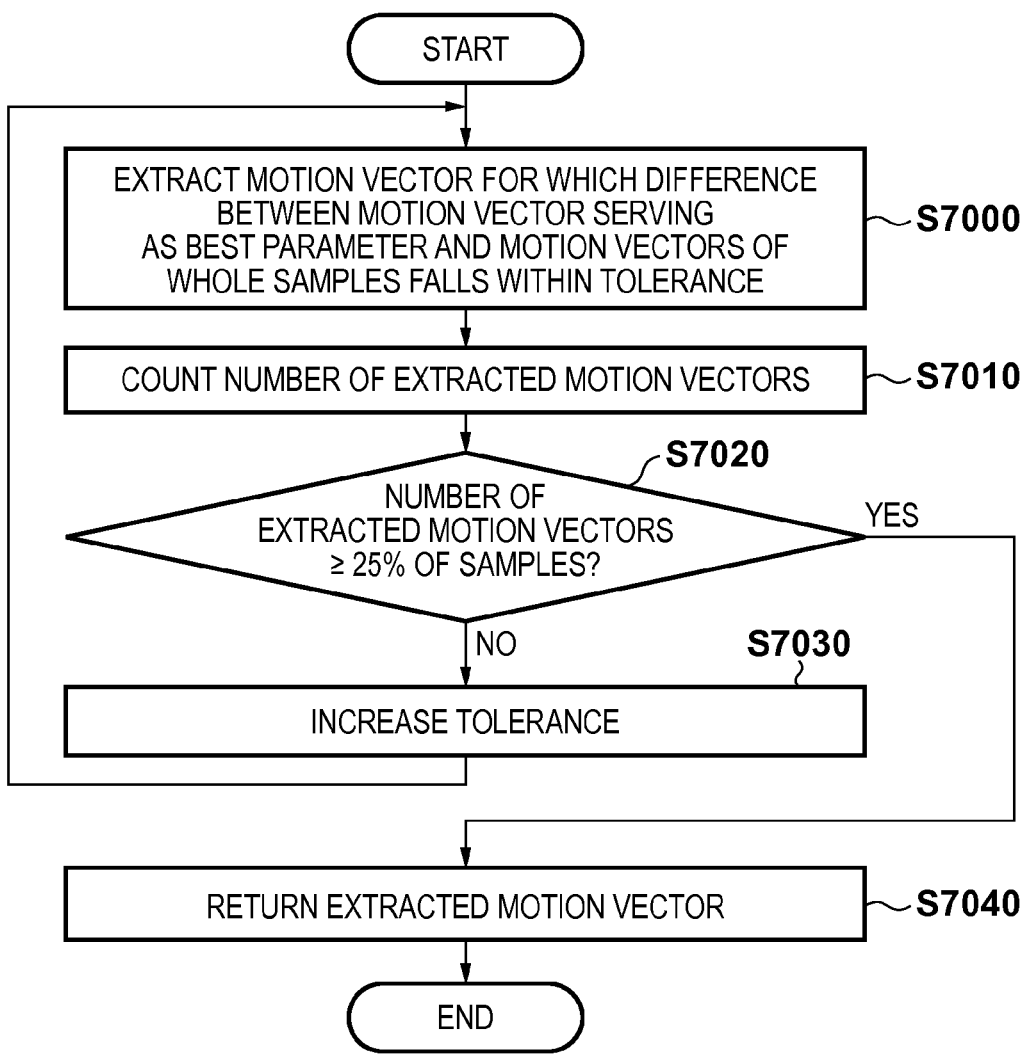
FIG. 7 is a flowchart showing details of similar motion vector extraction processing.

The second embodiment will be described next in which a rotation matrix is estimated from continuous images, and digital image-stabilization processing is performed. In this embodiment, processing of extracting similar motion vectors shown in FIG. 7 is executed as a subroutine, instead of executing the step of extracting similar motion vectors in step S3030 of FIG. 3, unlike the first embodiment. The remaining processes are performed according to the first embodiment.

The operation of similar motion vector extraction will be described below with reference to FIG. 7. FIG. 7 is a flowchart showing details of similar motion vector extraction processing.

In step S7000, a CPU 105 extracts a motion vector (similar motion vector) in a region, whose difference from the representative vector in the region serving as a best parameter falls within a tolerance $e_2'$ The initial value of $e_2'$ is set to 1.

$$V_d' = |\{v \in Y_d | \text{dist}(\vec{v_d}, \vec{v}) \le e_2'\}| \quad (16)$$

In step S7010, the CPU 105 counts the number of extracted motion vectors. Let $c'_{inlier}$ be the value. This value can be expressed as $c'_{inlier} = |V_d'|$ In step S7020, the CPU 105 determines whether the number of extracted data is equal to or larger than a predetermined ratio of motion vectors in the region. The predetermined ratio is, for example, 25%. In this embodiment, the ratio of the number of motion vectors whose difference from the representative vector falls within the tolerance to the total number of motion vectors in the region is expressed as $r'_{inlier}$ At this time, $r'_{inlier}$ can be calculated as $$r'_{inlier} = \frac{V_d'}{Y_d} \quad (17)$$

If the determination result is true (YES in step S7020), the process advances to step S7040. If false (NO in step S7020), the process advances to step S7030.

In step S7030, the CPU 105 increases the tolerance $e_2'$ to predetermined times (for example, 1.5 times). After that, the process returns to step S7000.

In step S7040, the CPU 105 returns the extracted motion vectors to the subroutine invocation source. The set of motion vectors is $V_d'$ at the end of iteration.

In this embodiment, the motion vectors to be input to RANSAC to calculate a rotation matrix are the set of the motion vectors returned in step S7040.

As described above, according to the second embodiment, a small value is set to the initial value of the tolerance. Similar motion vectors are extracted by repeating iteration while making the tolerance large. That is, the tolerance for similar motion vector extraction is adaptively set. This makes it possible to avoid the problem that the sufficient number of motion vectors cannot be detected because the tolerance is too small. In this embodiment, iteration is repeated while making the tolerance large. Reversely, an arrangement that sets a large value to the initial value and makes the value small may be employed. In this case, when this embodiment is applied to image-stabilization, the initial value is the maximum correction amount of image-stabilization. For example, a value 10% the image height can be used.

An arrangement that combines the two methods may be employed. For example, an arrangement may be employed which searches for an optimum tolerance with which the inlier ratio falls within the range of 20% to 30% while increasing/decreasing the tolerance. Note that in this embodiment, the target inlier ratio is set to 25%. However, the target inlier ratio is not limited to this. For example, an appropriate value is set as the target inlier ratio in accordance with the target application, the processing speed, the characteristic of the input image, and the robust estimation algorithm used to estimate a matrix.

The third embodiment will be described next in which a rotation matrix is estimated from continuous images, and digital image-stabilization processing is performed. This embodiment is a modification of similar motion vector extraction processing according to the second embodiment.

In this embodiment, motion detection in step S2020 uses feature point detection. Image-stabilization processing based on a motion detection result by feature point detection and that based on a motion detection result by block matching are fundamentally the same except the motion detection. In feature point detection, however, the number of motion vectors generated from feature points can hardly be constant. In addition, the motion vector distribution may be uneven.

Figure 8:
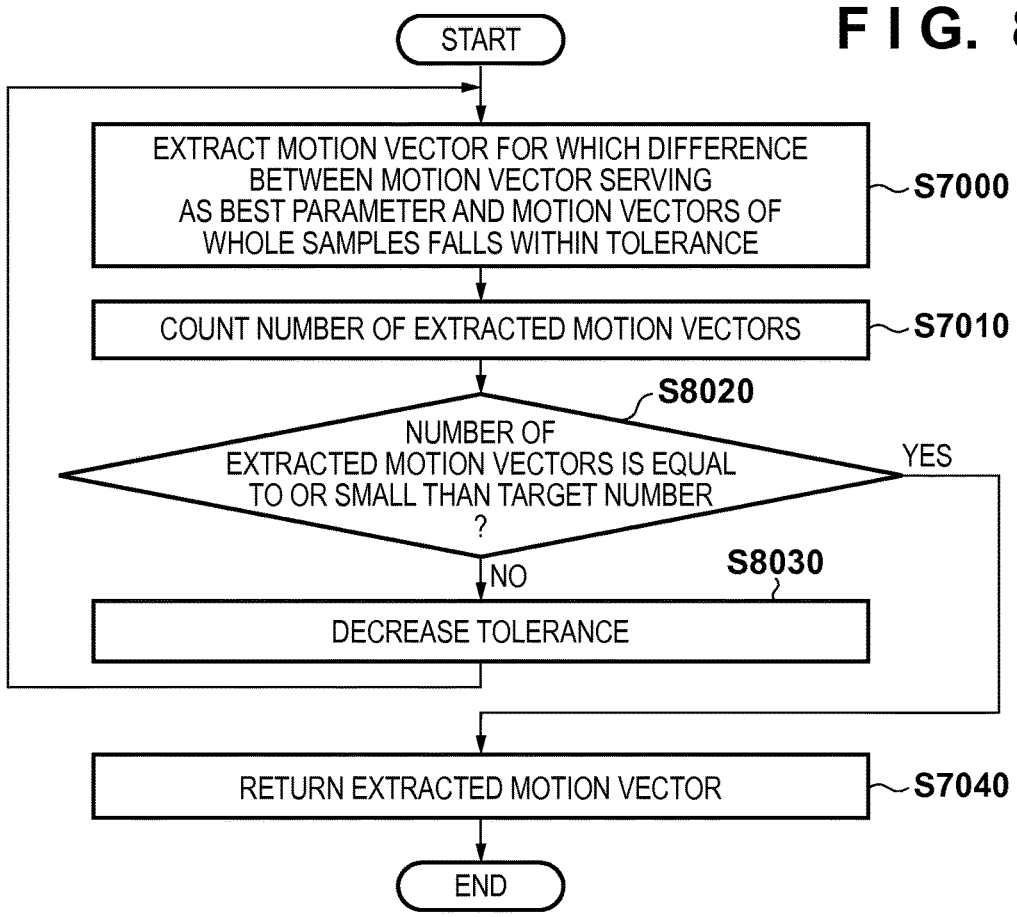
FIG. 8 is a flowchart showing details of similar motion vector extraction processing.

The operation of similar motion vector extraction will be described below with reference to FIG. 8. FIG. 8 is a flowchart showing details of similar motion vector extraction processing. Since FIG. 8 is a modification of the flowchart of FIG. 7 of the second embodiment, the same step numbers as in FIG. 7 denote the same steps, and a detailed description thereof will be omitted.

In step S8020, a CPU 105 determines whether the number of extracted motion vectors is equal to or smaller than the target number of extracted motion vectors. The target number is, for example, 15. If the determination result is true (YES in step S8020), the process returns to step S7040. If false (NO in step S8020), the process returns to step S7000.

In step S8030, the CPU 105 decreases the tolerance. This is implemented by, for example, increasing the tolerance to predetermined times (for example, 0.75 times). After that, the process returns to step S7000. Note that the initial value of the tolerance is set to a large value, for example, a value 10% the image height in advance.

As described above, according to the third embodiment, similar motion vectors are extracted by repeating iteration while making the tolerance small. That is, the tolerance for similar motion vector extraction is adaptively set. This makes it possible to avoid the problem that the tolerance is too large, and too many motion vectors that are unnecessary because of a high outlier ratio are extracted.

In this embodiment, iteration is repeated while making the tolerance small. Reversely, an arrangement that sets a small value to the initial value and makes the value large may be employed. Alternatively, an arrangement that combines the two methods may be employed. For example, an arrangement may be employed which searches for an optimum tolerance with which the number of motion vectors falls within the range of 15 to 30 while increasing/decreasing the tolerance.

Note that in this embodiment, the target number of extracted motion vectors is set to 15. However, the number is not limited to this. An appropriate value is set as the target number of extracted motion vectors in accordance with the target application, the processing speed, the characteristic of the input image, and the robust estimation algorithm used to estimate a matrix. In RANSAC that estimates a 3×3 matrix, about 300 samples suffice at maximum. Hence, in this embodiment, 15 that is the value obtained by dividing 300 by 20, that is, the number of region divisions is set as the target number of extracted motion vectors.

The fourth embodiment will be described next in which a representative vector is calculated without using RANSAC.

Figure 9:
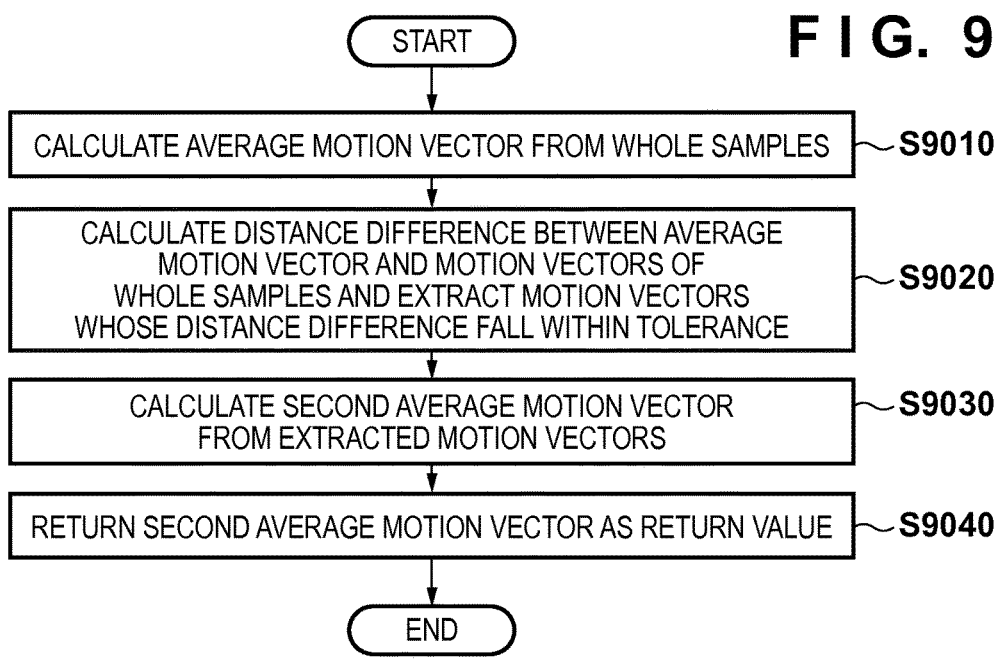
FIG. 9 is a flowchart showing details of representative vector calculation processing.

The operation of a subroutine of calculating a representative vector will be described below with reference to FIG. 9. FIG. 9 is a flowchart showing details of representative vector calculation processing. The flowchart of FIG. 9 is executed in place of the flowchart of FIG. 5 according to the first embodiment.

In step S9010, a CPU 105 calculates an average motion vector from whole motion vectors in a region. The average motion vector is calculated by $$\overrightarrow{v_{avg}} = \frac{\sum_{i=1}^{|V_d|} \overrightarrow{v_d^{[i]}}}{|V_d|} \quad (18)$$

In step S9020, the CPU 105 extracts motion vectors whose distance difference from the average motion vector falls within a tolerance $e_{avg}$. A set $V_{avg}$ of the extracted motion vectors can be expressed as $$V_{avg} = \{v \in V_d | \text{dist}(\overrightarrow{v_{avg}}, \overrightarrow{v}) \le e_{avg}\} \quad (19)$$

In step S9030, the CPU 105 calculates the average motion vector (second average motion vector) of the motion vectors extracted in step S9020 again.

$$\overrightarrow{v_d} = \frac{\sum_{i=1}^{|V_{avg}|} \overrightarrow{v_{avg}^{[i]}}}{|V_{avg}|} \quad (20)$$

In step S9040, the CPU 105 returns the second average motion vector as a return value.

Image-stabilization can be performed by executing the processing described in the first embodiment using the return value $$\overrightarrow{v_d}$$

as the representative vector.

As described above, according to the fourth embodiment, since RANSAC is not used to calculate the representative vector, the representative vector can quickly be calculated, although this method is usable only when the outlier ratio of motion vectors in a divided region is low.

The fifth embodiment will be described next in which a representative vector is calculated for each divided region using intelligent region division.

Figure 10:
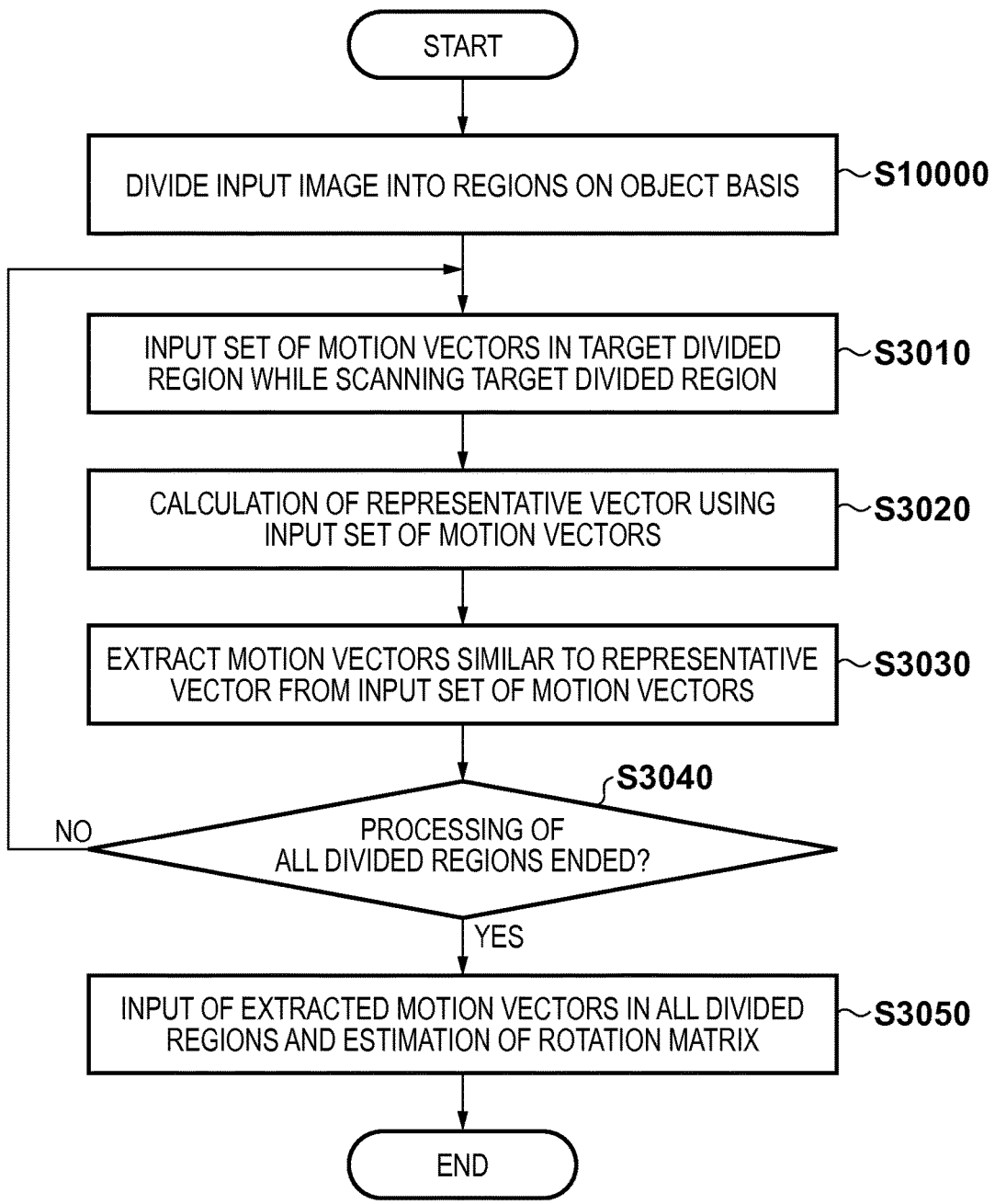
FIG. 10 is a flowchart showing details of transformation matrix estimation processing using region division on an object basis.

FIG. 10 is a flowchart showing details of transformation matrix estimation processing using region division on an object basis. In FIG. 10, step S10000 is added to the flowchart of FIG. 3 according to the first embodiment.

Figure 11:
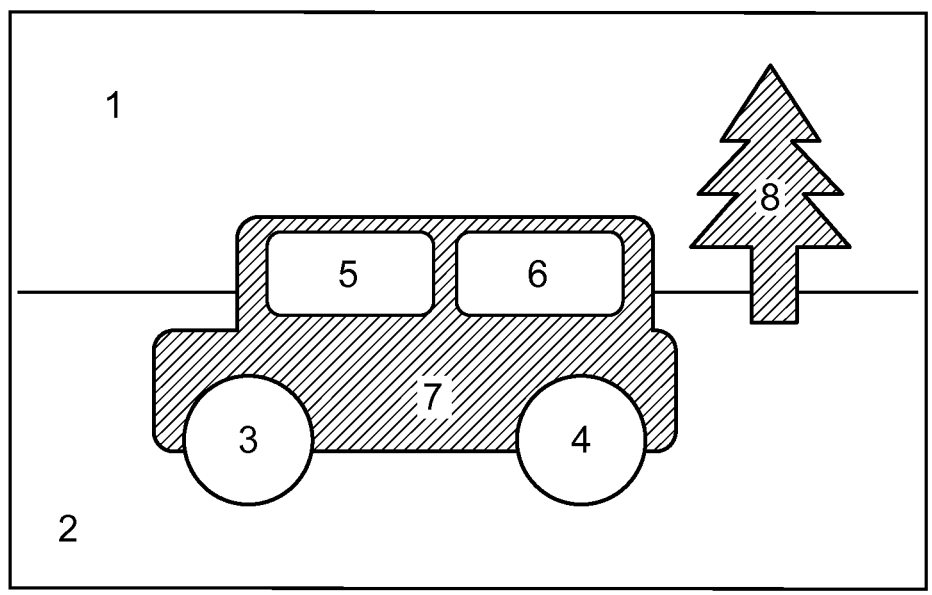
FIG. 11 is a view showing a state in which an image is divided on an object basis and an example of the numbers of divided regions.

In step S10000, a CPU 105 divides an input image into regions on an object basis. There are various region division methods. In this embodiment, the k-means method is used for division. The number of divisions is set to 8. Each divided region is assigned a number. The numbers can be assigned in an arbitrary order. Note that the division algorithm and the number of divisions are not limited to these, and any other method and number of divisions may be used. The image is thus divided as shown in, for example, FIG. 11. FIG. 11 is a view showing a state in which the image is divided on an object basis and an example of the numbers of divided regions. The numbers of divided regions can be assigned by any method.

From step S3010, the same processing as in the first embodiment is performed except that a divided region having an arbitrary shape is set as the subject instead of using a divided region segmented into a lattice shape.

As described above, according to the fifth embodiment, the image is divided on an object basis, and a representative vector is calculated for each object region. Since motion vectors included in the same object have the same vector components at a high possibility, the inlier ratio when extracting motion vectors similar to the representative vector can be raised even if the tolerance remains the same. Hence, in rotation matrix estimation, there is a strong tendency that motion vectors included in a set in which the area of the set of objects having the same motion is the largest become the principle components of the motion of the entire image. When performing image-stabilization using the estimated rotation matrix, the image-stabilization can be stably performed for a wide area.

Details of transformation matrix estimation processing of step S2020 (FIG. 2) according to the sixth embodiment will be described next with reference to FIG. 12. Note that digital image-stabilization processing executed by estimating a rotation matrix expressing the motion of an entire image from continuous images is the same as in FIG. 2.

Figure 12:
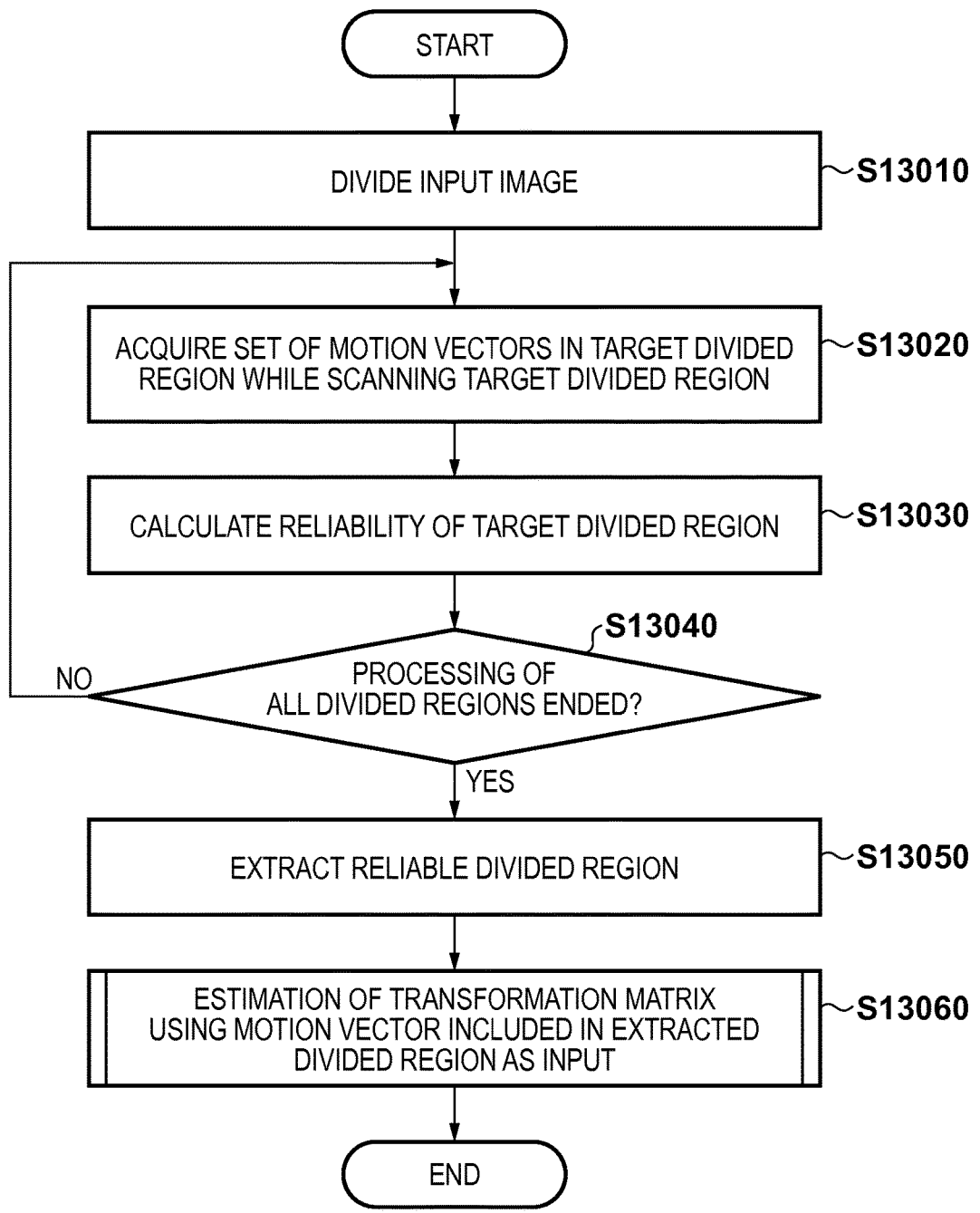
FIG. 12 is a flowchart showing details of transformation matrix estimation processing.

FIG. 12 is a flowchart showing details of transformation matrix estimation processing.

In step S13010, a CPU 105 divides an input image into a plurality of divided regions. The division method will be described later. In step S13020, the CPU 105 scans the target divided region and acquires a set of motion vectors in the divided region for each divided region.

The divided region scanning method is the same as that described with reference to FIGS. 4A and 4B. In the sixth embodiment as well, the divided regions are scanned in accordance with the raster order, as indicated by the numerical values shown in FIG. 4A. That is, when executing step S13010 for the first time, the divided region of number 1 is set as the processing target. When executing the step for the second time, third time, . . . , the divided regions of divided region numbers 2, 3, . . . , are set as the processing target.

In step S13020, motion vectors each having the end point (point with an arrowhead) in the target divided region are acquired, as in step S3010 (FIG. 3). In the sixth embodiment, let d be the number of the divided region, and the divided region will be expressed as a divided region d hereinafter. The number d starts from 1 and is incremented every time step S13020 is executed.

In step S13030, the CPU 105 calculates the reliability of each divided region. In the sixth embodiment, as will be described below, the center of gravity of each motion vector acquired in step S13020 is calculated for each divided region, and $R1_d$ that is the variance of distances from the calculated centers of gravity is used as the reliability.

$$R1_d = \begin{cases} \dfrac{\sum_{i=1}^{|Y_d|} |\vec{Y_d^{[i]}} - \vec{a_d}|^2}{|Y_d|} & |Y_d| > Y_{min} \\ INT\_MAX & |Y_d| \le Y_{min} \end{cases} \quad (21)$$

$$\text{for } \vec{a_d} = \dfrac{\sum_{i=1}^{|Y_d|} \vec{Y_d^{[i]}}}{|Y_d^{[i]}|}$$

$Y_{min}$ is set in accordance with the number of detected motion vectors per divided region. In the sixth embodiment, about 2,000 motion vectors are detected per screen. Since the number of divisions of the screen is 20, about 100 motion vectors are detected per divided region. For this reason, 10 corresponding to 10% the number of detected motion vectors is set to $Y_{min}$.

When $R1_d$ is expressed as a 32-bit integer with sign, INT_MAX is $2^{32}-1$. INT_MAX is a code representing that $R1_d$ is in a calculation disable state. The value itself is not particularly limited, and a sufficiently large value that is not calculated by equation (5) is set within the range of numerical values that can be expressed by $R1_d$. Large $R1_d$ indicates that the motion vectors in the region have low similarity.

For example, a building or the like has clear edges. In addition, motion vectors in a region including an object that is at standstill in itself readily become similar and have a high degree of contribution to detection of global motion. On the other hand, motion vectors detected from a divided region of a ruffled water surface or leaves swayed by the wind often express the motion of individual waves or leaves. Hence, the reliability calculated in this step is low. When the calculation disable state is expressed by a sufficiently large number, the reliability is regarded as low. Hence, simple processing can be performed without setting a special conditional branching in processing to be described later.

In step S13040, the CPU 105 determines whether the processing of all divided regions has ended. If the processing has ended (YES in step S13040), the process advances to step S13050. If the processing has not ended (NO in step S13040), the process returns to step S13010, and steps S13010 to S13040 are repeated.

In step S13050, the CPU 105 extracts reliable divided regions having high reliability. More specifically, as for the reliability, $var_d$ (d=1, . . . , $d_{max}$) are sorted in ascending order. An index d equal to or smaller than a predetermined value (for example, 67%) of the whole is extracted in ascending order of $R1_d$, and a set I of indices of divided regions having high reliability is obtained. In the sixth embodiment, since $d_{max}$=20, |I|=round(20×67/100)=13 (round is a function of rounding off the first decimal place to obtain an integer).

For example, when a data row representing $var_d$ is

| d | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|----|----|----|----|----|----|----|----|----|----|----|
| $var_d$ | 523 | 720 | 93 | 41 | 77 | INT_MAX | 131 | 72 | 6 | 87 | INT_MAX | 320 | 22 | 42 | 34 | 702 | 302 | 222 | 51 | 243 | sorting is done as follows

| d | 9 | 13 | 15 | 4 | 14 | 19 | 8 | 5 | 10 | 3 | 7 | 18 | 20 | 17 | 12 | 1 | 16 | 2 | 6 | 11 |
|---|---|----|----|---|----|----|---|---|----|---|---|----|----|----|----|---|----|---|---|----|
| $var_d$ | 6 | 22 | 34 | 41 | 42 | 51 | 72 | 77 | 87 | 93 | 131 | 222 | 243 | 302 | 320 | 523 | 702 | 720 | INT_MAX | INT_MAX |

When a predetermined number of (for example, 13) indices d are extracted from the calculated reliabilities in descending order, the set I of the indices is created as

I={9,13,15,4,14,19,8,5,10,3,7,18,20}

The small $R1_d$ indicates that the reliability is high. The set I can be considered as the set of indices of divided regions having a high reliability of motion vectors. Note that in the sixth embodiment, the index d equal to or smaller than the predetermined value, that is, 67% of the whole is extracted. However, the present invention is not limited to this.

In step S13060, the CPU 105 inputs the motion vectors included in the extracted divided region of high reliability and estimates the transformation matrix. At this time, when the set of motion vectors included in the divided region of high reliability is expressed as Z, Z can be expressed as $$Z=\{v \in Y_d | d=I[j], j=1 \ldots |I|\} \quad (22)$$

Transformation matrix estimation is implemented by calling the flowchart of FIG. 6 as a subroutine and calculating a rotation matrix. The input sample in this procedure corresponds to Z. The operation of the subroutine of calculating a rotation matrix will be described below with reference to FIG. 6.

In step S5000, the CPU 105 increments the iteration count.

In step S6010, the CPU 105 acquires four motion vectors from the input sample. In the sixth embodiment, the input sample is the set Z of motion vectors included in the divided region of high reliability, which are extracted in the flowchart of FIG. 12.

In step S6011, the CPU 105 calculates a matrix from the four acquired motion vectors. At this time, the acquired motion vectors are expressed as sample_$v_j$=(($x_j'$,$y_j'$),($x_j$,$y_j$)) for $j$=1,2,3,4

The calculated matrix is a transformation matrix $H_C$ in step S2020 (FIG. 2), as described in the first embodiment.

In this step, equations are solved using 16 variables obtained from the four motion vectors, thereby calculating the elements of the rotation matrix, which meet equation (14) described in the first embodiment.

In step S6020, the CPU 105 calculates, in the whole sample, the distance between the end point of a motion vector and a point formed by projecting the starting point of the motion vector by the calculated matrix, and counts the number of data whose distance falls within the tolerance as the number of inliers. Let V be the set of inliers. V can be calculated by $$V=\{v \in Z | \text{norm}(\text{proj}(H_C,(x',y'))-(x,y)) \le e\} \text{ for } v=\{(x',y'),(x,y)\} \quad (23)$$

Note that the results of sandwiching a vector and a pair of variables having a coordinate form by | | in the argument of norm( ) are defined as the L2 norm of the vector and the distance from the origin, respectively.

A tolerance e depends on the image size and the like. In the sixth embodiment, 3 corresponding to about 1/300 the image height of the image size (image height×image width) is set. Note that this value is not limited to about 1/300 the image height. Note that Z is the set of motion vectors included in the divided region of high reliability.

In step S5030, the CPU 105 determines whether the number of inliers is maximized by iterations up to this point. Note that as an exception, when step S5030 is executed for the first time, the process always advances to step S5040.

In step S5040, the CPU 105 stores the matrix calculated in step S5030 as a best parameter. Note that the best parameter is sequentially updated every time step S5060 is executed.

In step S5050, the CPU 105 determines whether the iteration count has reached the upper limit.

Note that in this embodiment, the upper limit is 50. However, the count is not limited to this. For example, when the frame rate of the input image is 30 fps, the flowchart of FIG. 2 needs to be completed within 33 ms. For this reason, an optimum value is decided in accordance with the specifications and number of CPUs 105.

In step S5060, the CPU 105 determines whether the iteration count is sufficient. The iteration count is determined to be sufficient when the iteration count exceeds a value N calculated by equation (11) described above.

In the sixth embodiment, $r_{inlier}$ in equation (11) is calculated by $$r_{inlier} = \frac{|V|}{|Z|} \quad (24)$$

Note that V is the set of inliers, and Z is the set of motion vectors included in the divided region of high reliability.

In step S5070, the CPU 105 returns the best parameter as the return value. In the sixth embodiment, the rotation matrix when step S5070 is executed is returned.

As calculated by equation (11), when motion vectors of a low ratio of inliers (to be referred to as an inlier ratio hereinafter) are input, and the rotation matrix or homography matrix is estimated using RANSAC, the iteration count becomes large. In addition, M estimation that is one of robust estimation technologies, in which the processing is relatively light, and the processing time is short, cannot exhibit sufficient estimation performance when the outlier ratio is high. For example, predetermined motion vectors expressing the motion of a water surface or leaves swayed by the wind are often disordered with respect to motion parameters expressing the motion of the entire screen.

To prevent this, in the sixth embodiment, the reliability is calculated for each divided region before matrix estimation, and a reliable divided region having high reliability is selected. That is, processing is executed while excluding divided regions including predetermined motion vectors (expressing the motion of, for example, a water surface or leaves swayed by the wind) as much as possible. In this way, the motion vectors included in the reliable divided region having high reliability of motion vectors are input, and a rotation matrix is estimated using RANSAC. This can decrease the iteration count or improve the estimation performance of M estimation.

The processing of calculating the variance that is the reliability of the divided region has a very small processing amount because no complex matrix operation exists. For this reason, when it is applied to RANSAC, the total processing time can largely be shortened even considering the overhead of processing of extracting the similar motion vectors as preprocessing.

For example, in an image having a frame rate of 30 fps, processing of one frame needs to be completed within 33 ms. For this reason, the iteration count needs to have an upper limit. In this case as well, when the sixth embodiment is used, the iteration count hardly reaches the upper limit, and the matrix can stably be estimated. Hence, when applying image-stabilization to an image using a matrix, the probability of matrix estimation failure lowers, and more stable and natural image-stabilization can be performed. Note that in the sixth embodiment, motion parameter estimation processing has been described using image-stabilization as an example. However, the application is not limited to this. The embodiment is also applicable to any other application such as image composition.

As described above, according to the sixth embodiment, when calculating the motion parameters expressing global motion in an image by robust estimation, the robust estimation is performed using only motion vectors included in a divided region determined to be reliable. This makes it possible to lower the outlier ratio and shorten the processing time. When the upper limit of the iteration count is set to complete the processing within a predetermined time or moving image processing or the like, the ratio that the iteration count reaches the upper limit can be lowered, and the estimation performance can be stabilized.

In the seventh embodiment, an arrangement that estimates a rotation matrix from continuous images and performs digital image-stabilization processing will be described. In the seventh embodiment, a step of extracting similar motion vectors is added to the flowchart (transformation matrix estimation processing) of FIG. 12 according to the sixth embodiment. Transformation matrix estimation processing including the step of extracting similar motion vectors will be described with reference to FIG. 13. The remaining processes are performed according to the sixth embodiment.

Note that the similar motion vector is a motion vector for which the absolute value of the difference between a representative vector that is a motion vector representing a divided region and the vector component of the processing target motion vector falls within a predetermined range (within a tolerance/threshold).

The operation of similar motion vector extraction processing will be described below with reference to FIG. 13.

Figure 13:
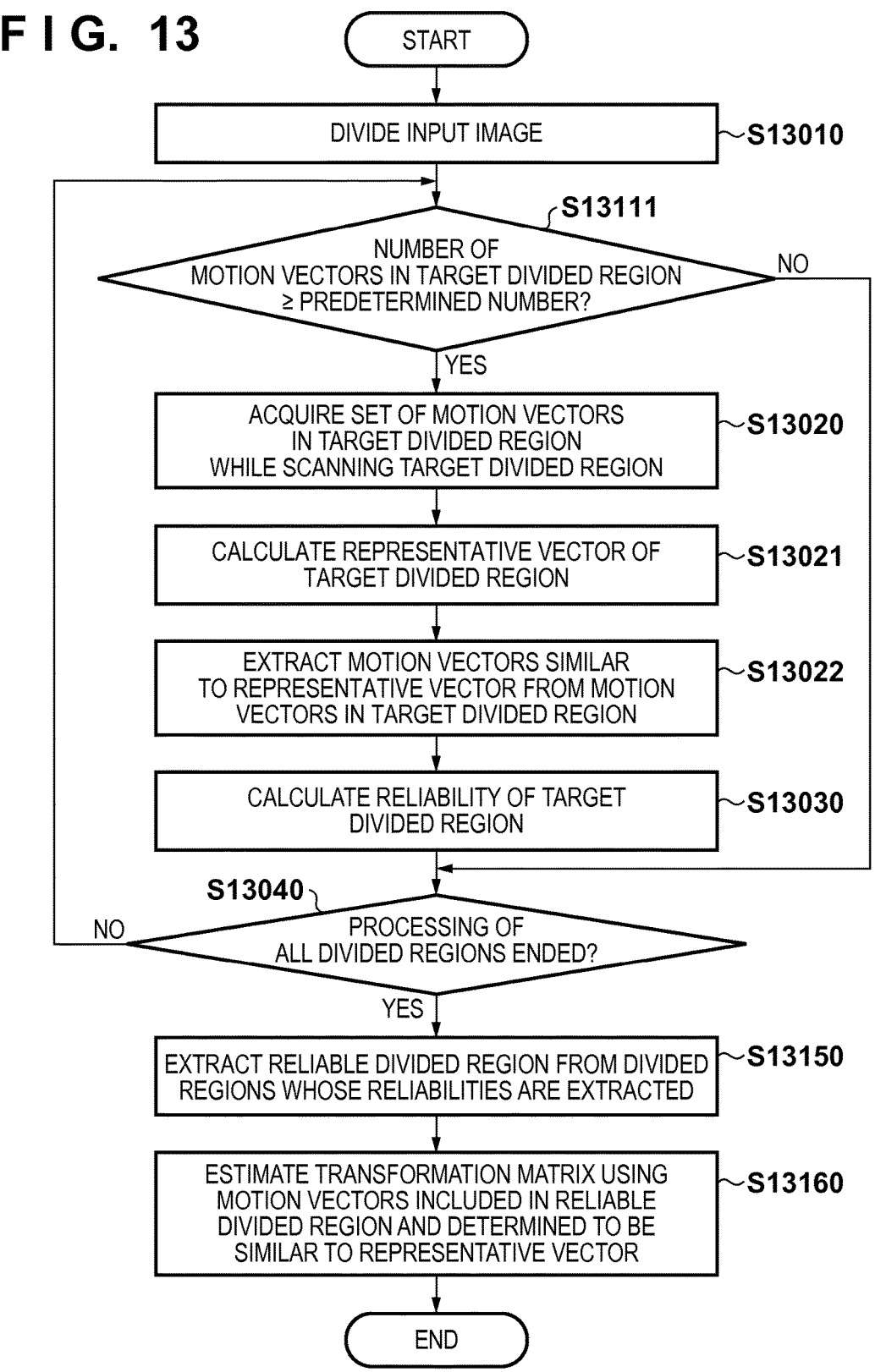
FIG. 13 is a flowchart showing details of similar motion vector extraction processing.

FIG. 13 is a flowchart showing details of transformation matrix estimation processing including similar motion vector extraction processing.

In step S13111, a CPU 105 determines whether the number of motion vectors in the target divided region is a predetermined number or more while scanning the target divided region. If the number of motion vectors is the predetermined number or more (YES in step S13111), the process advances to step S13020. If the number of motion vectors is smaller than the predetermined number (NO in step S13111), the process advances to step S13040. In the seventh embodiment, it is determined whether the number of motion vectors is the predetermined number, that is, 10 corresponding to 10% the number of detected motion vectors per divided region or more. However, the predetermined number is not limited to 10.

In step S13021, the CPU 105 calculates the representative vector of each divided region. The operation of a subroutine of calculating a representative vector will be described here with reference to FIG. 5.

Note that in the seventh embodiment, the CPU 105 acquires motion vectors at random from whole samples in step S5020. The whole samples in the operation of this subroutine are all motion vectors included in the target divided region. In the seventh embodiment, one motion vector sample_v is acquired.

In step S5020, the CPU 105 calculates the differences between the acquired motion vector and the whole samples, and counts the number of data whose differences fall within the tolerance as the number of inliers. In the seventh embodiment, the data is the vector component of the motion vector, and the set of motion vectors extracted because of the differences within the tolerance, which is given by $Y'_d$ is expressed as $$Y'_d = \{v \in Y_d | \mathrm{norm}(\overrightarrow{\mathrm{sample\_v}}, \vec{v}) \leq e\} \tag{25}$$

Note that $Y_d$ is the set of vectors included in a divided region d. At this time, $|Y'_d|$ corresponds to the number of inliers.

In step S5040, the CPU 105 stores the motion vector acquired in step S5010 as a best parameter. In the seventh embodiment, the best parameter is $\overrightarrow{\mathrm{best\_v}_d}$ By setting $\overrightarrow{\mathrm{best\_v}_d} = \overrightarrow{\mathrm{sample\_v}}$ $\overrightarrow{\mathrm{best\_v}_d}$ is updated.

In step S5050, the CPU 105 determines whether the iteration count has reached the upper limit.

In step S5060, the CPU 105 determines whether the iteration count is sufficient. The iteration count is determined to be sufficient when it exceeds a value N calculated by equation (8). In the seventh embodiment, since a two-dimensional vector is calculated, m=2 in equation (11). In addition, $r_{inlier}$ in equation (11) is calculated by $$r_{inlier} = \frac{|Y'_d|}{|Y_d|} \tag{26}$$

In step S5070, the CPU 105 returns the best parameter $$\overrightarrow{best\_v_d}$$

as the return value.

Referring back to FIG. 13, in step S13022, the CPU 105 extracts motion vectors similar to the representative vector from the motion vectors in the divided region. In the seventh embodiment, $$\overrightarrow{best\_v_d}$$

returned in step S7090 corresponds to the representative vector of the divided region. Let $$Y_d''$$

be the set of the extracted similar motion vectors.

$$Y_d''$$

is calculated by $$Y_d''=\{v \in Y_d | \mathrm{norm}(\overrightarrow{best\_v_d}, \vec{v}) \le e\} \quad (27)$$

In step S13030, the CPU 105 acquires the reliability in the divided region. The reliability is calculated by $$R2_d = \frac{|Y_d''|}{|Y_d|} \quad (28)$$

This equation is used to calculate the inlier ratio of the divided region. The reliability according to the seventh embodiment is the inlier ratio itself. The processing is performed considering that the higher the inlier ratio of the divided region is, the higher the reliability is. Note that $Y_d$ is the set of vectors included in the divided region d.

In step S13150, the CPU 105 extracts a reliable divided region having high reliability from the divided regions whose reliability has been extracted. In the seventh embodiment, since the reliability is the inlier ratio, a divided region whose inlier ratio is equal to or larger than a predetermined value (for example, 67%) is extracted as a reliable divided region.

In step S13160, the CPU 105 estimates a transformation matrix using the set of motion vectors included in the extracted reliable divided region and determined to be similar to the representative vector. In the seventh embodiment as well, a rotation matrix is calculated by calling the flowchart of FIG. 6 as a subroutine. The input sample is $$Y_d''$$

that is the set of motion vectors determined to be similar to the representative vector.

As described above, according to the seventh embodiment, when calculating the reliability of a divided region, not the variance of motion vectors but a motion vector representing the divided region is calculated as the representative vector, and the ratio of motion vectors similar to the representative vector out of the motion vectors included in the divided region is obtained as the reliability. In this form, although the operation amount increases as compared to a simple variance, the influence of motion vectors that largely fall outside the tolerance due to a motion detection failure can be excluded, and the reliability can therefore be calculated more robustly. In addition, motion vectors similar to the representative vector in the divided region are extracted, and a global parameter is calculated using only the motion vectors. This makes it possible to further lower the outlier ratio at the time of rotation matrix estimation and decrease the iteration count.

Note that in the seventh embodiment, the reliability is the ratio of motion vectors similar to the representative vector. However, the same effect as described above can be obtained even when the error sum of squares of the representative vector and the motion vectors included in the divided region is used as the reliability, as indicated by $$R3_d = \begin{cases} \dfrac{\displaystyle\sum_{i=1}^{|Y_d|} \left|\overrightarrow{Y_d^{[i]}} - \overrightarrow{best\_v_d}\right|^2}{|Y_d|} & |Y_d| > Y_{min} \\ \mathrm{INT\_MAX} & |Y_d| \le Y_{min} \end{cases} \quad (29)$$

At this time, the processing is performed considering that the smaller the error sum of squares of the divided region is, the higher the reliability is.

In the eighth embodiment, an arrangement that estimates a rotation matrix from continuous images and performs digital image-stabilization processing will be described. The eighth embodiment is a modification of the sixth embodiment using different expressions.

In the sixth embodiment, $R1_1, \ldots, R1_{dmax}$ are sorted, and the indices of divided regions are extracted in step S13050 (FIG. 12). In the eighth embodiment, however, sorting is not performed. Instead, a threshold is set, and a divided region whose $R1_d$ is smaller than the threshold is regarded as a reliable divided region and extracted. More specifically, this process is done using $$R = |\{r \in R1_d \mid r \ne \mathrm{INT\_MAX}\}| \quad (30)$$

$$e = \frac{\displaystyle\sum_{d=1}^{|R|} |R[d]|}{|R|} \quad (31)$$

$$I' = \{d \mid R1_d < e\} \quad (32)$$

As described above, according to the eighth embodiment, divided regions whose reliability can be calculated are extracted, and the set of the divided regions is defined as a population R. Statistical processing is performed for the reliabilities of the divided regions included in the population R (average is calculated), and a reliable divided region is extracted from the population R using the statistical processing result (average value) as the threshold. I' is the set of indices of reliable divided regions. This arrangement makes it possible to omit the processing of sorting the reliabilities of the divided regions and extract reliable divided regions with a smaller processing amount.

In the eighth embodiment, the reliability of a current frame is determined by the threshold. However, the present invention is not limited to this, and the reliability may be calculated from the moving average of reliabilities of continuously input and processed frames. A modification of the eighth embodiment will be described below. For example, when performing, for the cth frame, statistical processing (calculating an average) using a predetermined number of (for example, 15) continuous past frames as a population, a threshold $e_{avg}$ is calculated by $$e_{avg} = \frac{\sum_{c-15}^{c} \sum_{d=1}^{|R|} |R_n[d]|}{\sum_{c-15}^{c} |R_n|} \quad (33)$$

A divided region whose reliability is smaller than the threshold is regarded as a reliable divided region, and an index is extracted.

In the eighth embodiment, since the description has been made assuming that images are input at 30 fps, the average of frames for 0.5 sec, that is, 15 frames is calculated. The value is not limited to 15. For example, when images are input at 60 fps, an arrangement that calculates the average of 30 frames may be employed.

In the eighth embodiment, for example, when a person abruptly goes across the field of a camera, a blur image is obtained because the person goes out of focus. The accuracy of motion vectors calculated from the image tends to be low. When processing a single frame, the threshold largely varies depending on the area of the region of the invading person. When the average of several frames is calculated as in the eighth embodiment, the variation in the threshold can be suppressed. Alternatively, a deviation may be calculated from $R1_1, \ldots, R1_{dmax}$, and, for example, a divided region whose deviation is less than 50 may be regarded as a reliable divided region. In this method, the processing may be performed based on not only the simple average value but also the statistical representative value.

In the ninth embodiment, an arrangement that switches processing contents in accordance with control state of lenses of an image capture apparatus 200, estimates a rotation matrix, and performs digital image-stabilization processing will be described.

In the ninth embodiment, a CPU 105 receives, from an external image capture apparatus 109 or an image capture unit 110, a signal (optical control information) representing whether zooming or focusing is being performed, and the angle of view changes, that is, whether a lens serving as an optical element is under the control, and controls transformation matrix estimation processing based on the received signal. The rest of the operation is the same as in the sixth embodiment.

Details of transformation matrix estimation processing according to the ninth embodiment will be described below with reference to FIG. 14.

Figure 14:
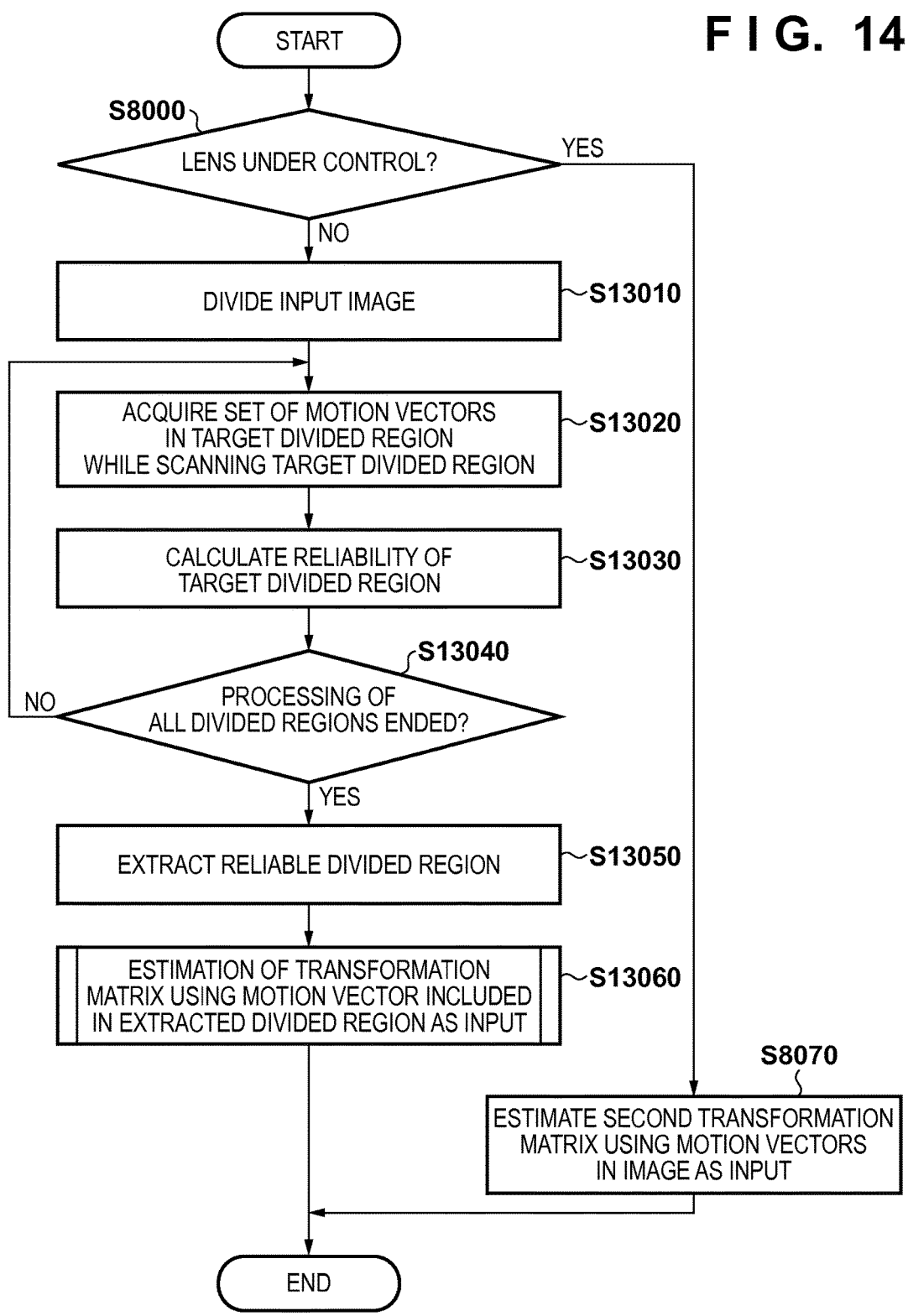
FIG. 14 is a flowchart showing details of transformation matrix estimation processing according to a lens control state.

FIG. 14 is a flowchart showing details of transformation matrix estimation processing according to a lens control state. The operation of FIG. 14 is the same as in the flowchart of FIG. 12 except that steps S8000 and S8070 are added to the flowchart of FIG. 12. The difference will be described below.

In step S8000, the CPU 105 determines whether the lens is under the control. If the lens is not under the control (NO ins step S8000), the process advances to step S13010. If the lens is under the control (YES ins step S8000), the process advances to step S8070.

In step S8070, the CPU 105 estimates a second transformation matrix using a motion vector in the image as an input. In the ninth embodiment, the second transformation matrix is assumed to be a homography matrix. The estimation method is assumed to be RANSAC. A transformation matrix estimated in step S13060 is a first transformation matrix with respect to the second transformation matrix estimated in step S8070.

As for motion vectors during lens control (lens control state), when the screen center where the optical axis exists is compared with a screen end, the motion vectors at the screen center are shorter. For this reason, the variance of the motion vectors at the screen center is small as well, and reliable divided regions concentrate to the screen center. In the ninth embodiment, the processes of steps S13010 to S13060 are bypassed during lens control, thereby avoiding this problem. In addition, since the angle of view changes during lens control, not a rotation matrix expressing pan/tilt/rotation about the optical axis but a homography matrix capable of expressing enlargement/reduction of an image is estimated. This makes it possible to correct blurs in the optical axis direction and blurs in enlargement/reduction changes which the rotation matrix cannot cope with.

In the ninth embodiment, the signal (control information) representing whether the lens is under the control is input from the external image capture apparatus 109 or the image capture unit 110. However, the present invention is not limited to this. For example, an image format capable of setting a flag representing whether the lens is under the control may be employed for an image data file to be recorded in an external storage 107. The flag may be input for each processed image to determine whether the lens is under the control. Alternatively, an image format capable of setting a focal length for each image data file may be employed. The focal length difference between continuous images may be calculated to determine whether the lens is under the control. When the difference exists, it is determined that the lens is under the control. Whether the lens is under the control may be analyzed and determined from image data.

In the ninth embodiment, processing of switching processing in accordance with the lens control state is added to the flowchart of FIG. 12. However, the present invention is not limited to this. For example, the processing of switching processing in accordance with the lens control state may be added to the flowchart of FIG. 13.

As described above, according to the ninth embodiment, in addition to the effects described in the first embodiment, appropriate digital image-stabilization processing can be executed in accordance with the operation state of the image capture apparatus.

In the 10th embodiment, an arrangement that calculates a representative vector for each divided region using intelligent region division will be described.

Figure 15:
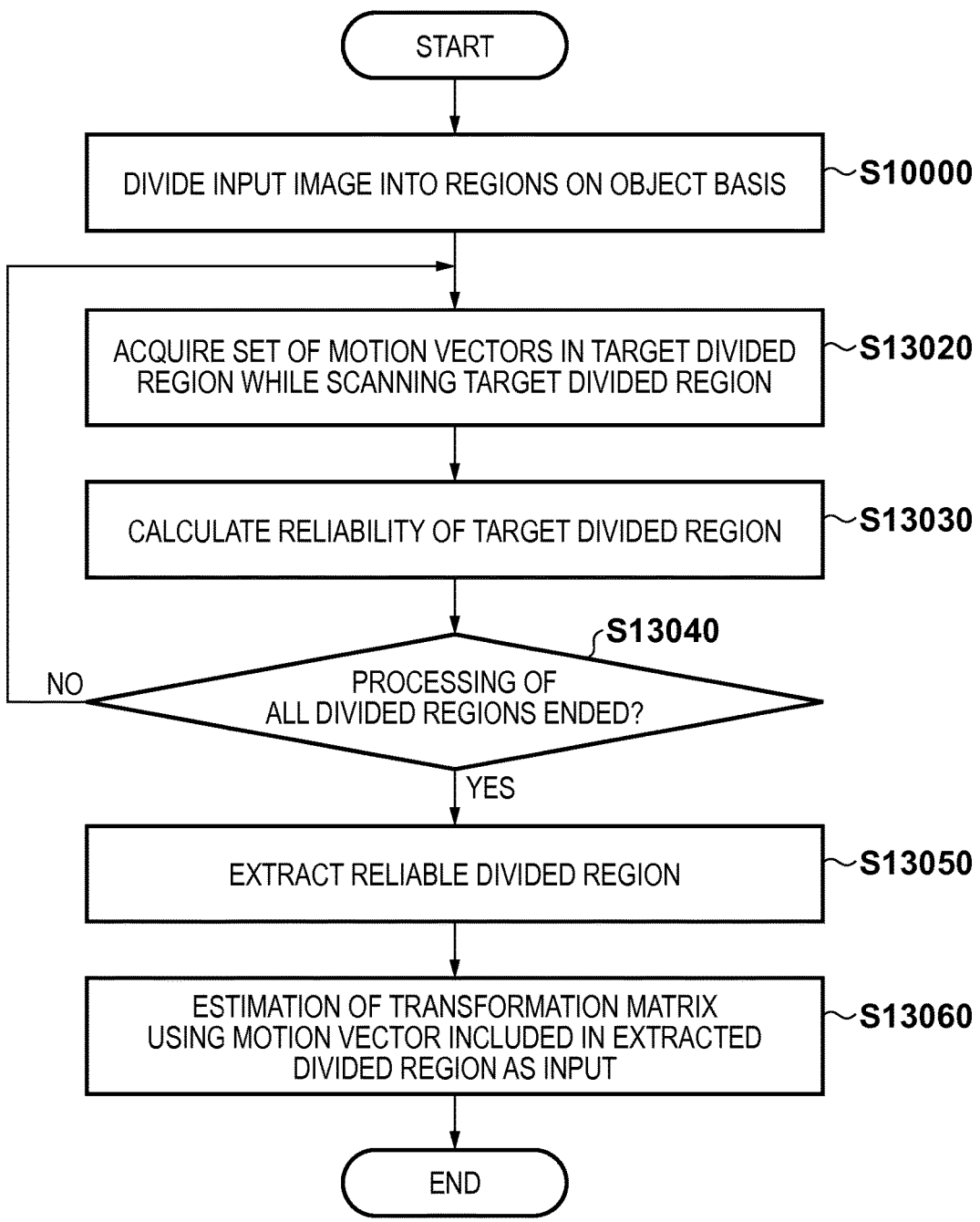
FIG. 15 is a flowchart showing details of transformation matrix estimation processing using region division on an object basis.

FIG. 15 is a flowchart showing details of transformation matrix estimation processing using region division on an object basis. In FIG. 15, step S10000 replaces step S13010 of FIG. 12 according to the sixth embodiment.

In step S10000, a CPU 105 divides an input image into regions on an object basis. There are various region division methods. In the 10th embodiment, the k-means method is used for division, as in the fifth embodiment. Note that the division algorithm and the number of divisions are not limited to those described above, and any other method and number of divisions may be used. The image is thus divided as shown in, for example, FIG. 11.

From step S10000, the same processing as in the sixth embodiment is executed except that a divided region having an arbitrary shape is set as the subject instead of using a divided region segmented into a lattice shape.

As described above, according to the 10th embodiment, the image is divided on an object basis, and a transformation matrix is estimated for each object region. Since motion vectors included in the same object have the same vector components at a high possibility, the inlier ratio when extracting motion vectors similar to the representative vector can be raised even if the tolerance remains the same. Hence, in transformation matrix estimation, there is a strong tendency that motion vectors included in a set in which the area of the set of objects having the same motion is the largest become the principle components of the motion of the entire image. When performing image-stabilization using the estimated transformation matrix, the image-stabilization can be stably performed for a wide area.

In the 11th embodiment, an arrangement that estimates a rotation matrix from continuous images and performs digital image-stabilization processing will be described. The 11th embodiment is a modification of the seventh embodiment using different expressions.

Figure 16:
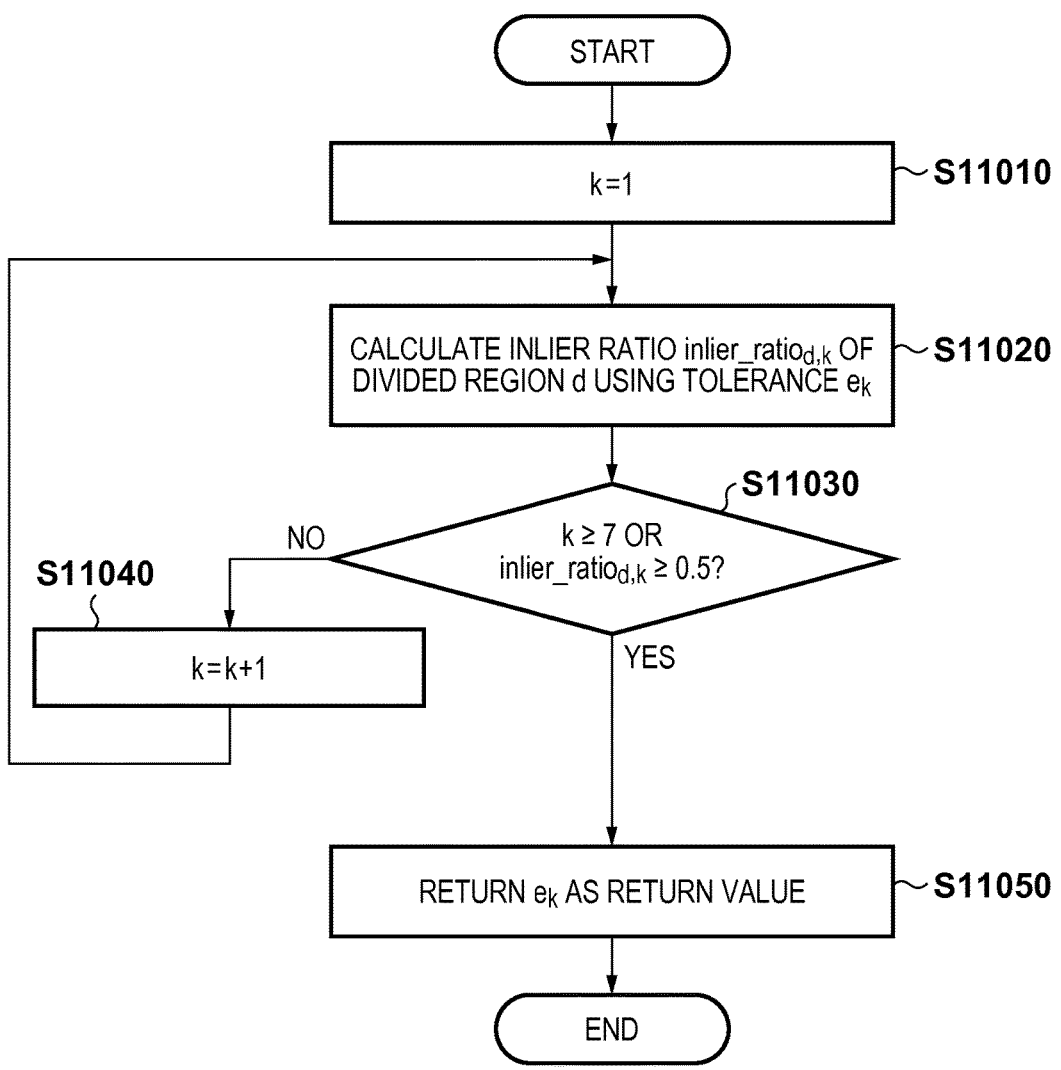
FIG. 16 is a flowchart showing details of reliability calculation processing.

In step S13030 (FIG. 13) according to the 11th embodiment, the flowchart shown in FIG. 16 is called as a subroutine, and the return value is defined as a reliability $R4_d$ of a divided region d.

FIG. 16 is a flowchart showing details of reliability calculation processing according to the 11th embodiment.

In step S11010, a CPU 105 substitutes 1 into k.

In step S11020, the CPU 105 calculates an inlier ratio $inlier\_ratio_{d,k}$ of the divided region d using a tolerance $e_k$. More specifically, the inlier ratio $inlier\_ratio_{d,k}$ is calculated by $$Y'''_{d,k} = \{v \in Y_d | \text{norm}(\overrightarrow{best\_v_d}, \vec{v}) \leq e_k\} \text{ for } e_k = 2^k \quad (34)$$

Equation (34) generates a set of motion vectors for each value k as $$Y'''_{d,k}$$

The threshold $e_k$ can be calculated by the power of 2, as described above. However, the calculation method is not particularly limited as long as a positive correlation exists for the value k. In addition, from the generated vector set, an inlier ratio is calculated by $$inlier\_ratio_{d,k} = \frac{|Y'''_{d,k}|}{|Y_d|} \quad (35)$$

In step S11030, the CPU 105 determines whether k≥7 or $inlier\_ratio_{d,k} \geq 0.5$. If the determination result is true (YES in step S11030), the process returns to step S11050. If the determination result of false (NO in step S11030), the process advances to step S11040. Note that in the 11th embodiment, the processing is aborted when $inlier\_ratio_{d,k} \geq 0.5$. However, the inlier ratio is not limited to 0.5, that is, 50% or more.

In step S11040, the CPU 105 increments the value k by one. The processes of steps S11020 to S11040 are repeated until the processing is aborted by the determination of step S11030.

In step S11050, the CPU 105 returns $e_k$ to the subroutine call source as a return value. The value k is determined when the processing is aborted in step S11030.

In the 11th embodiment, the minimum error upon determining that the inlier ratio exceeds 50% is defined as the reliability. The processing is performed considering that the smaller the value is, the higher the reliability is. As described above, in the 11th embodiment as well, the reliability can be calculated.

As described above, according to the 11th embodiment, when the ratio of motion vectors for which the difference between the motion vector included in a divided region and a representative vector that is a motion vector representing the divided region falls within a predetermined range (within a threshold) falls within a specific range, the threshold is calculated as the reliability. This can further improve the accuracy of reliability in addition to the effects described in the seventh embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-222685, filed Oct. 25, 2013, and Japanese Patent Application No. 2014-053987, filed Mar. 17, 2014 which are hereby incorporated by reference herein in their entirety.

What is claimed is:

1. An image processing apparatus that calculates information according to an interframe motion of a moving image based on motion vectors detected in the moving image, the image processing apparatus comprising:
    at least one processor and at least one memory cooperating to act as units comprising:
    (1) a detection unit configured to detect motion vectors in a frame of a moving image;
    (2) a specifying unit configured to specify, from the motion vectors detected by the detection unit, one or more motion vectors that belong to a region of interest of a plurality of regions obtained by dividing the frame;
    (3) a determination unit configured to, in a case where a plurality of motion vectors that belong to the region of interest are specified by the specifying unit, determine, from the plurality of motion vectors that belong to the region of interest, a representative motion vector of the region of interest;
    (4) an extraction unit configured to, from the plurality of motion vectors that belong to the region of interest other than the representative motion vector of the motion vectors that belong to the region of interest extract, as motion vectors having components that are similar to the representative motion vector of the region of interest, only motion vectors that satisfy a predetermined condition; and (5) a calculation unit configured to, where the specifying, determining, and extracting are performed to a plurality of regions in the frame, calculate a rotation matrix as the information according to the interframe motion of the moving image based on one or more motion vectors of the extracted motion vectors of in each of the plurality of regions, wherein the calculation unit selects a predetermined number of motion vectors from motion vectors extracted in each of the plurality of regions, and calculates a rotation matrix based on the selected motion vectors, wherein the predetermined number is equal to or more than 4, and wherein the calculation unit (a) compares (1) the difference between a terminal point of a motion vector extracted in each of the plurality of regions and a point to which a motion vector extracted in each of the plurality of regions is projected using a calculated rotation matrix with (2) a first tolerance, (b) counts a number of motion vectors that do not exceed the first tolerance, and (c) determines the rotation matrix by changing a combination of the motion vectors to be selected from motion vectors extracted in each of the plurality of regions, until a counted value satisfies a predetermined value.

2. The image processing apparatus according to claim 1, wherein the determination unit (a) selects a motion vector that is a processing target from the specified motion vectors of the region of interest (b) determines whether or not differences between (1) components of each of the motion vectors of the region of interest other than the selected motion vector that is the processing target and (2) components of the selected motion vector that is the processing target are smaller than a predetermined value, and (c) counts a number of motion vectors for which a difference is smaller than the predetermined value, and wherein the determination unit determines the representative motion vector of the region of interest based on the number of motion vectors for which the difference is smaller than the predetermined value.

3. The image processing apparatus according to claim 1, wherein the calculation unit calculates a transformation matrix representing transform of the frame as the information according to the interframe motion of the moving image.

4. The image processing apparatus according to claim 1, wherein the at least one processor and the at least one memory further cooperate to act as a processing unit configured to perform image-stabilization processing for the frame based on the information calculated by the calculation unit.

5. The image processing apparatus according to claim 1, wherein the extraction unit extracts, from motion vectors of the region of interest specified by the specifying unit, the motion vectors of the region of interest for which a difference from the components of the representative motion vector of the region of interest is smaller than a predetermined value.

6. The image processing apparatus according to claim 1, wherein the at least one processor and the at least one memory further cooperate to act as:

a variation determination unit configured to, for each of the plurality of regions, determine a variation in the motion vectors detected in that region, wherein the extraction unit, for each of the plurality of regions, extracts the motion vectors based on the variation in the motion vectors detected in that region.

7. The image processing apparatus according to claim 6, wherein the variation determination unit, for each of the plurality of regions, determines, as the variation, a variance of the motion vectors detected in that region.

8. The apparatus according to claim 6, wherein the variation determination unit, for each of the plurality of regions, determines the variation in the motion vectors in that region based on a difference between the components of representative motion vector of that region and components of vectors other than the representative motion vector of that region.

9. A method of causing an image processing apparatus to calculate information according to an interframe motion of a moving image based on motion vectors detected in the moving image, the method comprising:

detecting motion vectors in a frame of a moving image;

specifying, from the motion vectors detected in the detecting, one or more motion vectors that belong to a region of interest of a plurality of regions obtained by dividing the frame;

in a case where a plurality of motion vectors that belong to the region of interest are specified in the specifying, determining, from the plurality of motion vectors that belong to the region of interest, a representative motion vector of the region of interest;

extracting, as motion vectors having components that are similar to the representative motion vector of the region of interest, from the plurality of motion vectors that belong to the region of interest other than the representative motion vector of the region of interest, only motion vectors that satisfy a predetermined condition; and where the specifying, determining, and extracting are performed to a plurality of regions in the frame, calculating a rotation matrix as the information according to the interframe motion of the moving image based on one or more motion vectors of the extracted motion vectors in each of the plurality of regions, wherein, in the calculating, a predetermined number of motion vectors are selected from motion vectors extracted in each of the plurality of regions, and a rotation matrix is calculated based on the selected motion vectors, wherein the predetermined number is equal to or more than 4, and wherein, in the calculating, (a) (1) the difference between a terminal point of a motion vector extracted in each of the plurality of regions and a point to which a motion vector extracted in each of the plurality of regions is projected using a calculated rotation matrix and (2) a first tolerance are compared, (b) a number of motion vectors are counted that do not exceed the first tolerance, and (c) the rotation matrix is determined by changing a combination of the motion vectors to be selected from motion vectors extracted in each of the plurality of regions, until a counted value satisfies a predetermined value.

10. The method according to claim 9, wherein a motion vector that is a processing target is selected from the specified motion vectors of the region of interest, wherein it is determined whether or not differences between (1) components of each of the motion vectors of the region of interest other than the selected motion vector that is the processing target and (2) components of the selected motion vector that is the processing target are smaller than a predetermined value, wherein the number of motion vectors for which a difference is smaller than the predetermined value is counted, and wherein the representative motion vector of the interest is determined based on the number of motion vectors for which the difference is smaller than the predetermined value.

11. The method according to claim 9, wherein image-stabilization processing is performed for the frame based on the calculated information.

12. The method according to claim 9, wherein the motion vectors in the region of interest for which a difference from the components of the representative motion vector of the region of interest is smaller than a predetermined value are extracted from motion vectors of the region of interest specified in the specifying.

13. The method according to claim 9, further comprising:
determining, for each of the plurality of regions, a variation in the motion vectors detected in that region, wherein, for each of the plurality of regions, the motion vectors in that region that are similar to the representative motion vector of that region are extracted based on the variation in the motion vectors detected in that region.

14. The method according to claim 13, wherein, for each of the plurality of regions, the variation in the motion vectors in that region is determined based on a difference between components of the representative motion vector of that region and components of vectors other than the representative motion vector of that region.

15. A non-transitory storage medium storing a computer program that is executed by a computer to cause the computer to perform a method of calculating information according to an interframe motion of a moving image based on motion vectors detected in the moving image, the method comprising:

detecting motion vectors in a frame of a moving image;
specifying, from the motion vectors detected in the detecting, one or more motion vectors that belong to a region of interest of a plurality of regions obtained by dividing the frame;
in a case where a plurality of motion vectors that belong to the region of interest are specified in the specifying, determining, from the plurality of motion vectors that belong to the region of interest, a representative motion vector of the region of interest;
extracting, as motion vectors having components that are similar to the representative motion vector of the region of interest, from the plurality of motion vectors that belong to the region of interest other than the representative motion vector of the region of interest, only motion vectors that satisfy a predetermined condition; and
where the specifying, determining, and extracting are performed to a plurality of regions in the frame, calculating a rotation matrix as the information according to the interframe motion of the moving image based on one or more motion vectors of the extracted motion vectors of each of the plurality of regions, wherein, in the calculating, a predetermined number of motion vectors are selected from motion vectors extracted in each of the plurality of regions, and a rotation matrix is calculated based on the selected motion vectors, wherein the predetermined number is equal to or more than 4, and wherein, in the calculating, (a) (1) the difference between a terminal point of a motion vector extracted in each of the plurality of regions and a point to which a motion vector extracted in each of the plurality of regions is projected using a calculated rotation matrix and (2) a first tolerance are compared, (b) a number of motion vectors are counted that do not exceed the first tolerance, and (c) the rotation matrix is determined by changing a combination of the motion vectors to be selected from motion vectors extracted in each of the plurality of regions, until a counted value satisfies a predetermined value.

16. The non-transitory storage medium according to claim 15, wherein a motion vector that is a processing target is selected from the specified motion vectors of the region of interest, wherein it is determined whether or not differences between (1) components of each of the motion vectors of the region of interest other than the selected motion vector that is the processing target and (2) components of the selected motion vector that is the processing target are smaller than a predetermined value, wherein the number of motion vectors for which a difference is smaller than the predetermined value is counted, and wherein the representative motion vector of region of interest is determined based on the number of motion vectors for which the difference is smaller than the predetermined value.

17. The non-transitory storage medium according to claim 15, wherein image-stabilization processing is performed for the frame based on the calculated information.

18. The non-transitory storage medium according to a claim 15, wherein the method further comprises:
determining, for each of the plurality of regions, a variation in the motion vectors detected in that region, wherein, for each of the plurality of regions, the motion vectors in that region that are similar to the representative motion vector of that region are extracted based on the variation in the motion vectors detected in that region.

19. The non-transitory storage medium according to claim 18, wherein, for each of the plurality of regions, the variation in the motion vectors in that region is determined based on a difference between components of representative motion vector of that region and components of vectors other than the representative motion vector of that region.

20. The image processing apparatus according to claim 1, wherein the determination unit determines, as the representative motion vector of the region of interest, an average of the specified motion vectors of the region of interest.

21. The image processing apparatus according to claim 1, wherein the calculation unit calculates the information according to the interframe motion by robust estimation.

22. The image processing apparatus according to claim 1, wherein the determination unit determines the representative motion vector of the region of interest based on the motion vectors that are detected in the region of interest for which a difference from components of the other motion vectors in the region of interest is less than a predetermined value.

23. The method according to claim 9, wherein the representative motion vector of the region of interest is determined based on the motion vectors for which a difference from components of the other motion vectors in the region of interest is less than a predetermined value.

24. The non-transitory storage medium according to claim 15, wherein the representative motion vector of the region of interest is determined based on the motion vectors for which a difference from components of the other motion vectors in the region of interest is less than a predetermined value.

25. The image processing apparatus according to claim 1, wherein the extraction unit determines, as the predetermined condition, whether or not an absolute value of the difference between (a) each of the plurality of motion vectors that belong to the region of interest other than the representative motion vector of the region of interest and (b) the representative motion vector of the region of interest exceeds a second tolerance.

26. The image processing apparatus according to claim 1, wherein the calculation unit selects four motion vectors from motion vectors extracted in each of the plurality of regions as the predetermined number of motion vectors.

27. The image processing apparatus according to claim 1, wherein the extraction unit determines, as the predetermined condition, whether or not a size of the difference between (a) each of the plurality of motion vectors that belong to the region of interest other than the representative motion vector of the region of interest and (b) the representative motion vector of the region of interest exceeds a second tolerance,
   wherein the calculation unit selects four motion vectors from motion vectors extracted in each of the plurality of regions, and calculates a rotation matrix based on the selected four motion vectors,
   wherein the second tolerance is set as a larger value than the first tolerance.

28. The image processing apparatus according to claim 1, wherein the detection unit (a) detects a feature point for each of a frame that is a processing target and an immediately preceding frame of the moving image, and (b) calculates, as a motion vector, a corresponding positional relationship between the feature point of the frame that is the processing target and the feature point of the immediately preceding frame, based on a feature amount of the feature point of the frame that is the processing target and a feature amount of the feature point of the immediately preceding frame.

* * * * *